(12) United States Patent
Hama et al.

(10) Patent No.: US 10,075,338 B2
(45) Date of Patent: Sep. 11, 2018

(54) RELAY CONTROL UNIT, RELAY CONTROL SYSTEM, RELAY CONTROL METHOD, AND RELAY CONTROL PROGRAM

(71) Applicant: NEC Corporation, Tokyo (JP)

(72) Inventors: Takayuki Hama, Tokyo (JP); Junichi Yamato, Tokyo (JP); Yasunobu Chiba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/349,717

(22) Filed: Nov. 11, 2016

(65) Prior Publication Data

US 2017/0063619 A1    Mar. 2, 2017

Related U.S. Application Data

(63) Continuation of application No. 13/137,926, filed on Sep. 21, 2011, which is a continuation of application No. PCT/JP2010/004419, filed on Jul. 6, 2010.

(30) Foreign Application Priority Data

Sep. 10, 2009   (JP) .................. 2009-209722

(51) Int. Cl.
  *H04L 12/24*    (2006.01)
  *H04L 12/46*    (2006.01)
  (Continued)

(52) U.S. Cl.
  CPC ...... *H04L 41/0816* (2013.01); *H04L 12/4625* (2013.01); *H04L 12/4641* (2013.01);
  (Continued)

(58) Field of Classification Search
  None
  See application file for complete search history.

(56) References Cited

U.S. PATENT DOCUMENTS

| 6,726,929 B1 | 4/2004 | Luong |
| 7,328,349 B2 | 2/2008 | Milliken |

(Continued)

FOREIGN PATENT DOCUMENTS

| CN | 101222379 A | 7/2008 |
| JP | 2000-83051 A | 3/2000 |

(Continued)

OTHER PUBLICATIONS

Japanese Office Action dated Aug. 25, 2015 with an English translation thereof.

(Continued)

*Primary Examiner* — Donald Mills
(74) *Attorney, Agent, or Firm* — Finnegan, Henderson, Farabow, Garrett & Dunner, L.L.P.

(57) ABSTRACT

Communication allowance determination means determines, using information of a packet received by a packet relay unit and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition. Rule setting means sets, at least in the packet relay unit receiving the packet, a rule of executing a process for suppressing forwarding of the packet to the destination unit, on condition that the communication allowance determination means determines not to allow the communication to the destination unit for the packet that meets the match condition.

18 Claims, 18 Drawing Sheets

(51) Int. Cl.
*H04L 12/721* (2013.01)
*H04L 12/759* (2013.01)
*H04L 29/06* (2006.01)

(52) U.S. Cl.
CPC ........ *H04L 41/0893* (2013.01); *H04L 45/028* (2013.01); *H04L 45/38* (2013.01); *H04L 63/0263* (2013.01); *H04L 63/0236* (2013.01); *H04L 63/0254* (2013.01)

(56) References Cited

U.S. PATENT DOCUMENTS

| | | | |
|---|---|---|---|
| 7,451,489 | B2 | 11/2008 | Cantrell et al. |
| 7,515,612 | B1 | 4/2009 | Thompson |
| 7,826,458 | B2* | 11/2010 | Rowell ................ H04L 43/026 370/395.31 |
| 7,856,661 | B1 | 12/2010 | Sebes et al. |
| 8,369,340 | B2* | 2/2013 | Rowell ................ H04L 43/026 370/235 |
| 8,495,725 | B2 | 7/2013 | Ahn |
| 8,588,056 | B1 | 11/2013 | Choi et al. |
| 2002/0143955 | A1 | 10/2002 | Shimada et al. |
| 2003/0123429 | A1 | 7/2003 | Hirota et al. |
| 2003/0126272 | A1* | 7/2003 | Corl, Jr. ................ H04L 47/10 709/230 |
| 2003/0204632 | A1 | 10/2003 | Willebeek-LeMair et al. |
| 2004/0093513 | A1 | 5/2004 | Cantrell et al. |
| 2004/0213152 | A1* | 10/2004 | Matuoka ................ H04L 29/06 370/230 |
| 2004/0213237 | A1 | 10/2004 | Yasue et al. |
| 2006/0114939 | A1 | 6/2006 | Singh |
| 2006/0143710 | A1 | 6/2006 | Desai et al. |
| 2006/0168318 | A1 | 7/2006 | Twiss |
| 2006/0288413 | A1 | 12/2006 | Kubota |
| 2007/0133547 | A1* | 6/2007 | Ko ................ H04L 47/10 370/392 |
| 2007/0140273 | A1 | 6/2007 | Kubota |
| 2007/0157316 | A1 | 7/2007 | Devereux et al. |
| 2008/0016562 | A1 | 1/2008 | Keeni |
| 2008/0077793 | A1 | 3/2008 | Tan et al. |
| 2009/0116398 | A1* | 5/2009 | Shi ................ H04L 47/10 370/252 |
| 2009/0138577 | A1 | 5/2009 | Casado et al. |
| 2009/0161696 | A1* | 6/2009 | Song ................ H04L 43/026 370/474 |
| 2009/0183252 | A1 | 7/2009 | Nomi |
| 2009/0183253 | A1 | 7/2009 | Kates |
| 2009/0252041 | A1 | 10/2009 | Dolganow et al. |
| 2010/0226373 | A1* | 9/2010 | Rowell ................ H04L 43/026 370/395.31 |

FOREIGN PATENT DOCUMENTS

| | | |
|---|---|---|
| JP | 2005-175635 A | 6/2005 |
| JP | 2005-197823 A | 7/2005 |
| JP | 2006-319808 A | 11/2006 |
| JP | 2009-117929 A | 5/2009 |
| JP | 2009-130838 A | 6/2009 |

OTHER PUBLICATIONS

Japanese Office Action dated Jul. 22, 2014, with English translation.
Hiroshi Kubota, "New Face Research & Development", Nikkei Network, Japan, Nikkei Business Publications Inc., Nov. 28, 2008, vol. 104, pp. 080-081.
Extended European Search Report dated Nov. 6, 2013.
Chinese Office Action dated Mar. 25, 2014, with English translation.
International Search Report (ISR) (PCT Form PCT/ISA/210) dated Sep. 21, 2010, with partial English translation.
Martin Casado, and five others, "Ethane: Taking Control of the Enterprise", ACM SIGCOMM Computer Communication Review, vol. 37, Issue 4, Session: Enterprise networks, pp. 1 to 12, Oct. 2007.
Martin Casado, and five others, "Architectural Support for Security Management in Enterprise Networks", Slide 11, [online], [search on Aug. 24, 2009], Internet <URL: http://www.soi.wide.ad.jp/project/sigcomm2007/pdf/sig11.pdf>.
Nick McKeown, and seven others, "OpenFlow: Enabling Innovation in Campus Networks", [online], [search on Aug. 24, 2009], Internet <URL: http://www.openflowswitch.org/documents/openflow-wp-latest.pdf>.

* cited by examiner

| LAYER | FIELD |
|---|---|
| Physical | Input Port No |
| Ethernet | MAC DA, MAC SA, VLAN ID, Type |
| IPv4 | IP SA, IP DA, Protocol |
| ICMP | ICMP Type, ICMP Code |
| TCP/UDP | Source Port, Destination Port |

| ACTION NAME | ACTION DESCRIPTION |
|---|---|
| OUTPUT | OUTPUT TO DESIGNATED PORT |
| SET_DL_DST | UPDATE MAC DA |

FIG. 23

| MESSAGE NAME | DIRECTION | USE |
|---|---|---|
| Packet In | SW ⇒ CTRL | NOTIFY CONTROLLER OF PACKET INPUT TO SWITCH |
| Flow Expired | SW ⇒ CTRL | NOTIFY CONTROLLER OF FLOW EXPIRATION |
| Packet Out | CTRL ⇒ SW | CONTROLLER INSTRUCTS SWITCH TO OUTPUT PACKET |
| Flow Mod | CTRL ⇒ SW | CONTROLLER REQUESTS SWITCH TO REGISTER, CHANGE, OR DELETE FLOW |

RELAY CONTROL UNIT, RELAY CONTROL SYSTEM, RELAY CONTROL METHOD, AND RELAY CONTROL PROGRAM

CROSS-REFERENCE TO RELATED PATENT APPLICATIONS

This application is a continuation of U.S. application Ser. No. 13/137,926, filed on Sep. 21, 2011, which is a continuation of International Application No. PCT/JP2010/004419, filed Jul. 6, 2010, which claims priority from Japanese Patent Application No. 2009-209722, filed Sep. 10, 2009. The contents of the above-referenced applications are expressly incorporated herein by reference.

TECHNICAL FIELD

The present invention relates to a relay control unit, a relay control system, and a relay control program for controlling processing performed by a packet relay unit, and a packet relay unit, a packet relay method, and a packet relay program applied to the relay control system.

BACKGROUND ART

Various network architectures in which a controller performs centralized management of operations of switches for forwarding packets are known. For example, NPL 1 and NPL 2 each describe a network architecture according to Ethane. Ethane is a network architecture including a controller that determines behaviors of packets transmitted and switches that are under control of the controller and forward packets.

Each switch includes a flow table for determining destinations of packets. Upon receiving a packet whose destination is indicated by an entry in the flow table, the switch transmits the packet based on the entry. Upon receiving a packet having no corresponding entry in the flow table, on the other hand, the switch forwards information of the packet to the controller. The controller has information about a communication network topology, and performs path computation for a packet for which communication is allowed. In detail, upon receiving the information of the packet from the switch, the controller determines whether to allow or not to allow communication of the packet. In the case of determining to allow the communication, the controller computes a path of the packet. The controller then adds a new destination entry to a flow table of each switch on the computed path. The switch subsequently transmits the packet based on the registered destination entry.

NPL 3 describes a network architecture according to OpenFlow (hereafter also referred to as "OF"). Like Ethane, OpenFlow is a network architecture in which a controller controls switches. In OpenFlow, a packet forwarding function and a path control function are separated by a flow control protocol, where the controller controls different types of switches using a uniform API (Application Program Interface). Besides, in OpenFlow, packet control in flow granularity is performed for faster datapath and lower control cost.

Each switch in OF includes a flow table for storing actions for received packets, and a secure channel through which the switch communicates with the controller. The switch and the controller communicate with each other on the secure channel, using an OF protocol.

FIG. 20 is an explanatory diagram showing flow entries stored in a flow table. The flow table stores, for each flow, a rule (Rule) against which a packet header is checked, an action (Action) defining a process for the flow, and flow statistic information (Statistics).

In the rule (Rule), a value (exact) for determining whether or not there is a match and a wildcard (wild card) are used. FIG. 21 is an explanatory diagram showing fields against which the packet header is checked. The following fields are used as search keys against which the packet header is checked.

(1) Input port number (Input Port No) of a Physical (physical) layer (2) MAC (Media Access Control) DA (MAC destination address), MAC SA (MAC source address), VLAN ID (Virtual LAN (Local Area Network) ID), or VLAN TYPE (priority) of an Ethernet (registered trademark) (Ethernet (registered trademark)) layer (3) IP SA (IP source address), IP DA (IP destination address), or IP protocol of an IPv4 (version4) layer (4) Source Port (TCP/UDP source port) and/or Destination Port (TCP/UDP destination port) of a TCP (Transmission Control Protocol)/UDP (User Datagram Protocol) layer (5) ICMP Type or ICMP Code of an ICMP (Internet. Control Message Protocol) layer The action (Action) is a process applied to a packet that matches the rule. FIG. 22 is an explanatory diagram showing actions set for a flow. For example, in the case where "OUTPUT" is set in the action, it means that the switch performs "output to designated port" on the packet that matches the rule. Likewise, in the case where "SET_DL_DST" is set in the action, it means that the switch performs "update MAC DA (destination unit)" to which the packet that matches the rule is transmitted.

The flow statistic information includes the number of packets and the number of bytes of packets that match the rule, an elapsed time (session duration) from reception of a last one of the packets, and the like. The flow statistic information is used for determining whether or not to delete the flow entry.

The following describes an operation in OF. Upon receiving a packet, the switch compares a packet header of the received packet with the rule in the flow table. In the case where the received packet does not match the rule, the switch forwards information of the packet to the controller, using a message in the secure channel. The controller computes a transmission path of the packet, based on a communication network topology. The controller then transmits a message for adding a flow entry to the flow table of the switch, to enable the switch to relay the packet along the transmission path. Subsequently, upon receiving a packet corresponding to the added flow entry, the switch performs a corresponding action (forwarding process), without forwarding information of the packet to the controller.

FIG. 23 is an explanatory diagram showing messages used on the secure channel. For example, the switch transmits a message "Packet in" to the controller, in the case of notifying the controller of an input packet. Likewise, the switch transmits a message "Flow Expired" to the controller, in the case of notifying the controller of expiration of a flow (session duration reaching a predetermined time). On the other hand, the controller transmits a message "Packet Out" to the switch, in the case of instructing the switch to output a packet. Likewise, the controller transmits a message "Flow Mod" to the switch, in the case of requesting the switch to register, change, or delete a flow.

CITATION LIST

Non Patent Literature

NPL 1: Martin Casado, and five others, "Ethane: Taking Control of the Enterprise", ACM SIGCOMM Computer Communication Review, Volume 37, Issue 4, SESSION: Enterprise networks, Pages: 1 to 12, October 2007

NPL 2: Martin Casado, and five others, "Architectural Support for Security Management in Enterprise Networks", Slide 11, [online], [search on Aug. 24, 2009], Internet <URL: http://www.soi.wide.ad.jp/project/sigcomm2007/pdf/sig11.pdf>

NPL 3: Nick McKeown, and seven others, "OpenFlow: Enabling innovation in Campus Networks", [online], [search on Aug. 24, 2009], Internet <URL: http://www.openflowswitch.org/documents/openflow-wp-latest.pdf>

SUMMARY OF INVENTION

Technical Problem

In the network architecture based on Ethane described in NPL 1 and NPL 2, for a packet which has no corresponding entry in the flow table and for which the controller does not allow communication, no path computation is typically performed and therefore no forwarding is performed. In many occasions, such a packet is accumulated in a queue of the switch, and discarded after a predetermined time elapses.

In the case where the switch receives again the packet for which the controller does not allow communication, the switch normally queries the controller again, and the controller determines again whether to allow or not to allow communication for the packet. That is, in the case where the switch repeatedly receives a packet for which communication is not allowed, the switch needs to query the controller each time, and also the controller needs to determine each time whether to allow or not to allow communication. This causes a problem of a high processing load on both the switch and the controller.

For example, when retransmission is repeatedly performed in TCP communication because a packet does not arrive at a destination unit, the switch will end up repeatedly receiving the same packet. In this case, each time the packet arrives at the switch, the switch queries the controller. This causes a problem of an increase in CPU load of both the switch and the controller.

In OpenFlow described in NPL 3, too, when the switch repeatedly transmits, to the controller, a packet for which communication, to a destination unit is not allowed, a problem of a high processing load on both the switch and the controller arises. Hence, it is desirable that the controller controls the switch so that such a packet can be processed appropriately.

In view of this, an exemplary object of the present invention is to provide a relay control unit, a relay control system, and a relay control program that can reduce a load of processing performed by a packet relay unit on a packet for which communication to a destination unit is not allowed, and a packet relay unit, a packet relay method, and a packet relay program that are applied to the relay control system.

Solution to Problem

A relay control unit according to the present invention is a relay control unit for controlling a packet relay unit, the relay control unit comprising: communication allowance determination means for determining, using information of a packet received by the packet relay unit and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and rule setting means for setting, at least in the packet relay unit receiving the packet, a rule of executing a process for suppressing forwarding of the packet to the destination unit, on condition that the communication allowance determination means determines not to allow the communication to the destination unit for the packet that meets the match condition.

A relay control system according to the present invention comprises: a packet relay unit; and a relay control unit for controlling the packet relay unit, wherein the relay control unit includes: communication allowance determination means for determining, using information of a packet received by the packet relay unit and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and rule setting means for setting, at least in the packet relay unit receiving the packet, a rule of executing a process for suppressing forwarding of the packet to the destination unit, on condition that the communication allowance determination means determines not to allow the communication to the destination unit for the packet that meets the match condition.

A packet relay unit according to the present invention comprises: flow storage means for storing a flow which is information associating a process for a received packet with information identifying the packet; and packet relay means for relaying the received packet based on the flow stored in the flow storage means, wherein the packet relay means transmits information of the packet to a relay control unit in the case where the flow associated with the received packet is not stored in the flow storage means, and processes the packet based on the flow set by the relay control unit, the relay control unit: determining, using the information of the received packet and based on a policy which is information associating a match condition with communicability information, whether to allow or not to allow communication to a destination unit for the packet that meets the match condition, the match condition being in identifying the packet, and the communicability information indicating whether to allow or not to allow the communication to the destination unit for the packet that meets the match condition; and setting, at least in a source unit receiving the packet, the flow of executing a process for suppressing forwarding of the packet that meets the match condition to the destination unit, on condition that the communication to the destination unit is determined not to be allowed for the packet.

A relay control method according to the present invention comprises: a relay control unit for controlling a packet relay unit determining, using information of a packet received by the packet relay unit and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and the relay control unit setting, at least in the packet relay unit receiving the packet, a rule of executing a process for suppressing forwarding of the packet to the destination unit, on condition that the communication to the destination unit is determined no to be allowed for the packet that meets the match condition.

A packet relay method according to the present invention comprises: relaying a received packet based on a flow stored in flow storage means for storing the flow which is information associating a process for the received packet with information identifying the packet; and transmitting information of the packet to a relay control unit in the case where the flow associated with the received packet is not stored in the flow storage means, and relaying the packet based on the flow set by the relay control unit, the relay control unit: determining, using the information of the received packet and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and setting, at least in a source unit receiving the packet, the flow of executing a process for suppressing forwarding of the packet that meets the match condition to the destination unit, on condition that the communication to the destination unit is determined not to be allowed for the packet.

A relay control program according to the present invention is a relay control program applied to a computer for controlling a packet relay unit, the relay control program causing the computer to execute: a communication allowance determination process of determining, using information of a packet received by the packet relay unit and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and a rule setting process of setting, at least in the packet relay unit receiving the packet, a rule of executing a process for suppressing forwarding of the packet to the destination unit, on condition that the communication to the destination unit is determined no to be allowed for the packet that meets the match condition in the communication allowance determination process.

A packet relay program according to the present invention is a packet relay program applied to a computer that includes flow storage means for storing a flow which is information associating a process for a received packet with information identifying the packet, the packet relay program causing the computer to execute a packet relay process of relaying the received packet based on the flow stored in the packet relay storage means, wherein in the packet relay process, the computer is caused to transmit information of the packet to a relay control unit in the case where the flow associated with the received packet is not stored in the flow storage means, and process the packet based on the flow set by the relay control unit, the relay control unit: determining, using the information of the received packet and based on a policy which is information associating a match condition with communicability information, whether to allow or not to allow communication to a destination unit for the packet that meets the match condition, the match condition being information identifying the packet, and the communicability information indicating whether to allow or not to allow the communication to the destination unit for the packet that meets the match condition; and setting, at least in a source unit receiving the packet, the flow of executing a process for suppressing forwarding of the packet that meets the match condition to the destination unit, on condition that the communication to the destination unit is determined not to be allowed for the packet.

Advantageous Effects of Invention

According to the present invention, a load of processing performed by a packet relay unit on a packet for which communication to a destination unit is not allowed can be reduced.

BRIEF DESCRIPTION OF DRAWINGS

FIG. 23 is an explanatory diagram showing messages used on a secure channel.

DESCRIPTION OF EMBODIMENT

Exemplary embodiments of the present invention are described below, with reference to drawings. The following describes the case where the present invention is applied to OpenFlow. That is, the following describes the case where the present invention is applied to OpenFlow including an OF switch (Open Flow Switch, hereafter referred to as "OFS") which is a packet relay unit and an OF controller (Open Flow Controller, hereafter referred to as "OFC") which is a unit (i.e. a relay control unit) for controlling the packet relay unit. Note, however, that a network architecture to which the present invention is applied is not limited to OpenFlow. The present invention is applicable to any other form of network architecture in which a relay control unit controls a packet relay unit.

First Exemplary Embodiment

Figure 1:
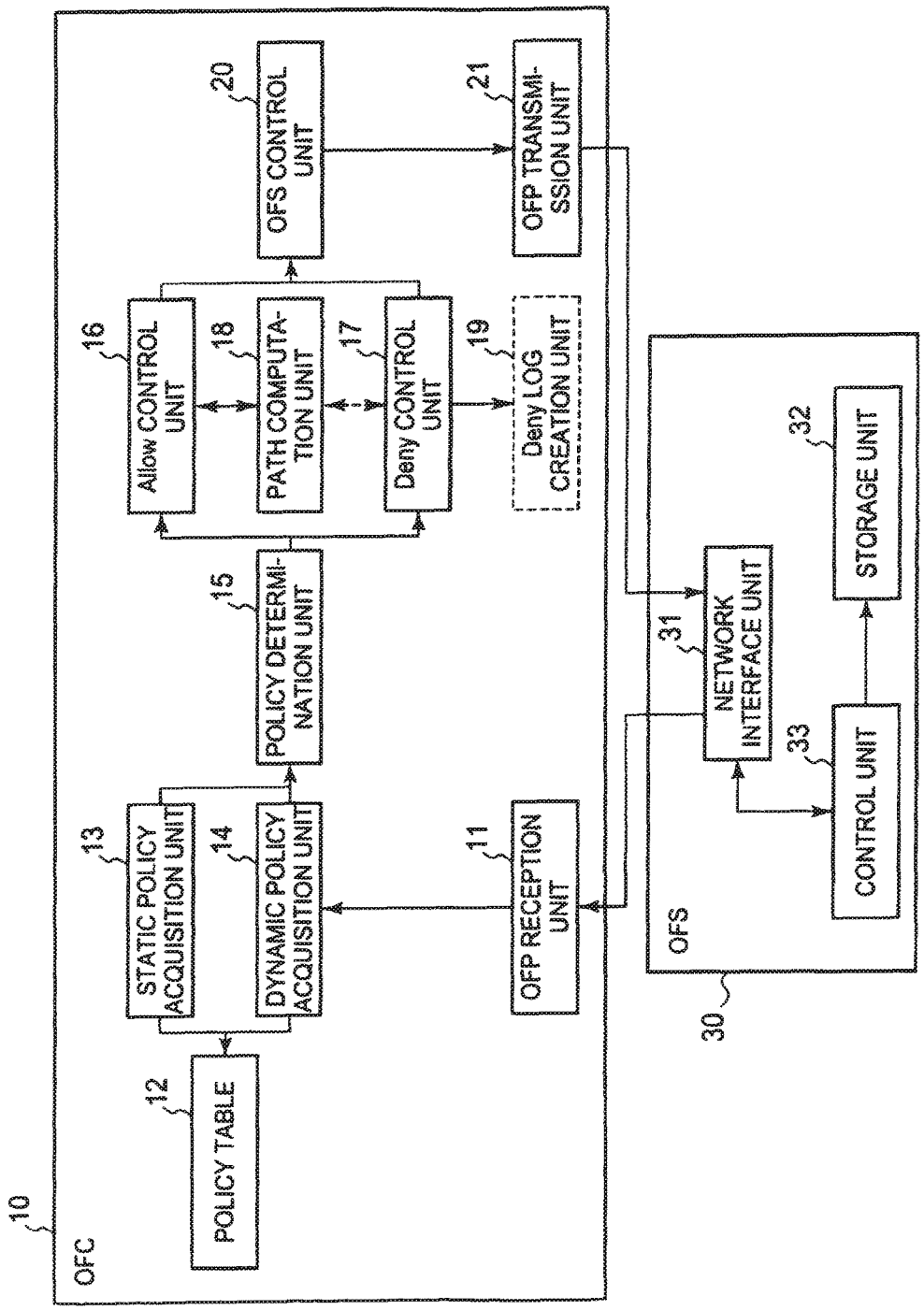
FIG. 1 is a block diagram showing an example of a relay control system in a first exemplary embodiment.

FIG. 1 is a block diagram showing an example of a relay control system in a first exemplary embodiment of the present invention. The relay control system in this exemplary embodiment includes an OFC 10 and an OFS 30, The OFC 10 is a controller that has network topology information and valid communication path information, and controls the OFS 30 in a communication network. In detail, the OFC 10 controls processing performed by the OFS 30 upon receiving a packet. The OFS 30 is a switch that forwards the received packet based on a set rule, under control of the OFC 10. The OFC 10 and the OFS 30 are connected to each other via the communication network, where a form of the communication network is not particularly limited. Though only one OFS 30 is shown in the relay control system in FIG. 1, the number of OFSs 30 is not limited to one, and may be two or more. Moreover, the OFC 10 may have a cluster structure composed of a plurality of computers which collectively achieve functions of the OFC 10.

The OFS 30 includes a network interface unit 31, a storage unit 32, and a control unit 33. The network interface unit 31 communicates with the OFC 10 or another switch (not shown).

The storage unit 32 stores a process (hereafter also referred to as "switch action.") for a received packet, in association with information identifying the packet. The switch action includes a process such as forwarding the received packet to a designated port, discarding (also referred to as "Drop") the packet, transmitting the packet to the OFC 10, or the like. As the information identifying the packet, the storage unit 32 may store, for example, a protocol number, a Src (Source) IP address, a Src port, a Dst (Destination) IP address, and a Dst port included in a set of information called 5-tuple. Note, however, that the information identifying the packet is not limited to 5-tuple. The storage unit 32 may store an input port, a VLAN (Virtual LAN) ID, an Ethertype, a Src MAC address, and a Dst MAC address included in a set of information called 10-tuple, as the information identifying the packet. Moreover, the storage unit 32 may store a VLAN priority included in a set of information called 11-tuple, as the information identifying the packet. Furthermore, the storage unit 32 may store a wildcard indicating arbitrary information, as the information identifying the packet. The storage unit 32 stores at least one pair of identification information and a switch action in association with each other. This identification information is information for determining the switch action, and accordingly is hereafter also referred to as "rule". In addition, information associating the rule with the switch action is also collectively referred to as "flow". Hence, the storage unit 32 can be regarded as a storage unit for storing the flow. For example, the storage unit 32 is realized by a magnetic disk unit or the like included in the OFS 30. The flow in the storage unit 32 is stored by the control unit 33 according to an instruction from the OFC 10.

The control unit 33 processes the received packet, based on the flow stored in the storage unit 32. In detail, upon receiving the packet from another unit, the control unit 33 compares header information of the packet with the rule in the flow, and executes the switch action of the rule corresponding to the header information. For instance, the control unit 33 may execute the switch action corresponding to the rule, in the case where the header information of the packet matches the identification information indicated by the rule. Note that, in the ca where the storage unit 32 stores, as the rule, an input port and a value of an arbitrary bit field in a payload, the control unit 33 may determine whether or not information identifying the received packet matches the information indicated by the rule. Moreover, in the case where the storage unit 32 stores a prefix of an IP add re as the rule, the control unit 33 may compare an IP address included in the received packet with the prefix to determine whether or not they match.

In the case where no flow corresponding to the received packet is stored in the storage unit 32, the control unit 33 transmits information of the received packet to the OFC 10. Subsequently, upon receiving a flow corresponding to the transmitted information of the packet from the OFC 10, the control unit 33 stores the received flow in the storage unit 32, and also executes a switch action indicated by the received flow. In OpenFlow, a packet not corresponding to any flow stored in the storage unit 32 as mentioned above is also referred to as "first packet".

Moreover, when the OFS 30 is connected to the communication network to which the OFC 10 is connected, the control unit 33 may notify the OFC 10 of information (e.g. a Hello message) indicating the connection. The control unit 33 may also receive identification information and a switch action (i.e. a flow) transmitted together from the OFC 10, and store these information in the storage unit 32.

The control unit 33 is realized by a CPU of a computer operating according to a program. For example, the program may be stored in the storage unit 32 in the OFS 30, with the CPU reading the program and operating as the control unit 33 according to the program.

The OFC 10 includes an OF protocol (hereafter referred to as "OFP") reception unit 11, a policy table 12, a static policy acquisition unit 13, a dynamic policy acquisition unit 14, a policy determination unit 15, an Allow control unit 16, a Deny control unit 17, a path computation unit 18, a Deny log creation unit 19, an OFS control unit 20, and an OFP transmission unit 21.

The OFP reception unit 11 receives a message based on the OFF, from the OFS 30. In detail, the OFP reception unit 11 receives a packet having no corresponding flow in the storage unit 32 in the OFS 30.

The policy table 12 stores information (hereafter referred to as "policy") that associates information (hereafter referred to as "match condition.") identifying a transmitted packet with communicability information (hereafter simply referred to as "action") indicating whether to allow or not to allow communication to a destination unit for a packet that meets the match condition. For example, the policy table 12 is realized by a magnetic disk unit or the like included in the OFC 10. The match condition may be the same as a rule used by a controller to identify a packet in OpenFlow. Moreover, for example, the same information (i.e. 5-tuple or 10-tuple) as the identification information (rule) stored in the storage unit 32 may be used as the match condition. The policy table 12 may store the policy beforehand, or store the policy according to an instruction from another unit or a user.

As mentioned above, the action is information indicating whether the packet is a packet for which communication to the destination unit is allowed (Allow) or a packet for which communication to the destination unit is not allowed (Deny). The action may include additional information indicating a process performed for the packet for which communication to the destination unit is not allowed (Deny). In this case, the policy table 12 stores the additional information in association with the action of each individual match condition. The additional information includes information such as disposing a Deny packet (drop), keeping a log (logging), setting a path to an external specific unit, or the like. The process for the packet for which communication to the destination unit is not allowed (Deny) is hereafter also referred to as "Deny process". The Deny process is a process for a packet that is not forwarded, and therefore can be regarded as a process for suppressing forwarding of the packet to the destination unit. Note that, in the case where there is only one type of Deny process, the policy table 12 does not need to store the additional information.

Figure 2:
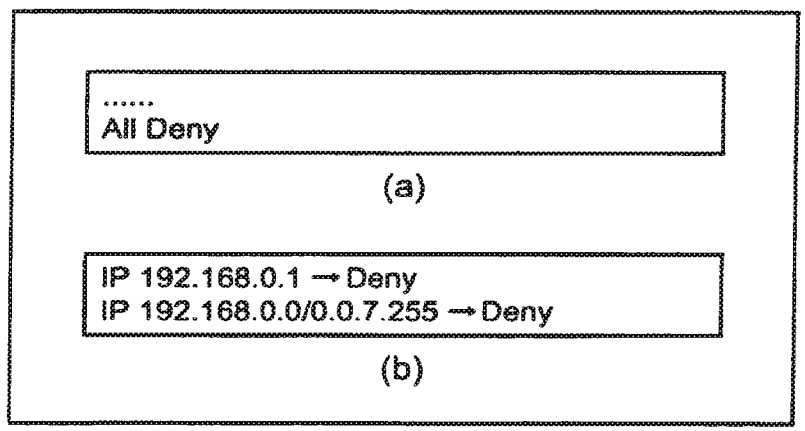
FIG. 2 is an explanatory diagram showing an example of policies for a Deny packet.

FIG. 2 is an explanatory diagram showing an example of policies for the packet for which communication to the destination unit is not allowed (Deny). FIG. 2(a) is an explanatory diagram showing an example where Deny is set in a last policy of set policies. In the example shown in FIG. 2(a), the packet is compared with the policies in the order in which the policies are set, and determined as Deny in the case where the packet does not match any of the policies preceding "All Deny".

FIG. 2(b) is an explanatory diagram showing an example of policies in the case of determining, based on information set in a payload of the packet, whether or not the packet is a Deny packet. "IP 192.168.0.1 Deny" shown as an example in FIG. 2(b) indicates that access from an IP address "192.168.0.1" is not allowed (determined as Deny). Meanwhile, "IP 192.168.0.0/0.0.7.255→Deny" shown as an example in FIG. 2(b) indicates that access from an IP address other than "192.168.0.0/255.255.248.0" is not allowed (determined as Deny).

Though the policy that uses an IP address as the identification information is shown as an example in FIG. 2, the information used as the identification information of the policy is not limited to an IP address. An ID identifying a terminal, such as a MAC (Media Access Control) address, may be used as the identification information of the policy. Moreover, information of a field identifying a protocol or an application, such as a protocol number or a port number, may be used as the identification information of the policy. Furthermore, value identifying a network, such as a VLAN ID or a MPLS (Multi-Protocol Label Switching) label, may be used as the identification information of the policy.

Alternatively, an input port of a switch may be used the identification information of the policy example of such a policy is "Deny a packet from Port1 of switch A". The policy may also include both the information set in the payload and the input port of the switch. An example of such a policy is "Deny access from IP 192.168.0.1 of Port1 of switch A".

The static policy acquisition unit 13 acquires a policy stored in the policy table 12. In detail, the static policy acquisition unit 13 determines whether or not an updated policy is included in the policies stored in the policy table 12, and reads the updated policy. As an example, the static policy acquisition unit 13 may access the policy table 12 on a regular basis, determine information different from previous access as an updated policy, and read the updated policy. The method of determining the updated policy, however, is not limited to the above-mentioned method. As another example, the policy table 12 may create a trigger at a timing of updating a policy and notify the static policy acquisition unit 13 of the trigger, where receiving the trigger causes the static policy acquisition unit 13 to determine that the policy is updated. Further, initialization of the policy table 12 may cause the static policy acquisition unit 13 to determine that all policies in the policy table 12 are updated.

Moreover, receiving the information (e.g. a Hello message) indicating that the OFS 30 is connected to the communication network may cause the static policy acquisition unit 13 to determine whether or not the policy table 12 is updated. Having read the updated policy, the static policy acquisition unit 13 notifies the policy determination unit 15 of the policy.

Thus, the OFS 30 receives the identification information and the action stored in the policy table 12, regardless of the received packet. Such transmitted/received identification information and action can therefore be called a static policy. Hence, the static policy acquisition unit 13 can be regarded as detecting the update of the static policy and acquiring the flow (i.e. match condition) and the action.

The dynamic policy acquisition unit 14 acquires a policy corresponding to the received information of the packet, from the policy table 12. In detail, the dynamic policy acquisition unit 14 compares the received information of the packet with each match condition stored in the policy table 12, and reads, from the policy table 12, an action corresponding to a match condition met by the received information of the packet. For example, in the case where the OFP reception unit 11 receives the information of the packet and the "Packet-in" message based on the OFP from the OFS 30, the dynamic policy acquisition unit 14 reads, on condition that the received information of the packet meets the match condition, the action corresponding to the match condition from the policy table 12. The "Packet-in" message mentioned here is a message used on a Secure Channel in OpenFlow, indicating that the packet input in the switch is notified to the controller. The dynamic policy acquisition unit 14 notifies the policy determination unit 15 of the read action and the information of the packet.

Though this exemplary embodiment describes the case where the OFC 10 includes both the static policy acquisition unit 3 and the dynamic policy acquisition unit 14, the OFC 10 may include any one or both of the static policy acquisition unit 13 and the dynamic policy acquisition unit 14.

The policy determination unit 15 determines, using the information of the packet received by the OFS 30, whether to allow or not to allow communication to the destination unit for the packet, based on the policy. In detail, upon receiving the action read by the dynamic policy acquisition unit 14 and the information of the packet received from the OFS 30, the policy determination unit 15 determines whether or not the action is an action of allowing communication to the destination unit in the case of an action of allowing (Allow) communication to the destination unit, the policy determination unit 15 determines to allow communication to the destination unit, and instructs the below-mentioned Allow control unit 16 to compute a forwarding destination of the packet in the case of an action of not allowing (Deny) communication to the destination unit, the policy determination unit 15 determines not to allow communication to the destination unit, and instructs the below-mentioned Deny control unit 17 to determine a Deny process of the packet.

The policy determination unit 15 may also determine whether to allow or not to allow communication to the destination unit for the packet indicated by the match condition of the updated policy, based on the policy. In detail, upon receiving the updated policy from the static policy acquisition unit 13, the policy determination unit 15 determines whether or not the action included in the policy is an action of allowing communication to the destination unit. In the case of an action of allowing (Allow) communication to the destination unit, the policy determination unit 15 determines to allow communication to the destination unit for the packet indicated by the match condition of the policy, and instructs the below-mentioned Allow control unit 16 to compute a forwarding destination of the packet. In the case of an action of not allowing (Deny) communication to the destination unit, the policy determination unit 15 determines not to allow communication to the destination unit for the packet indicated by the match condition of the policy, and instructs the below-mentioned Deny control unit 17 to determine a Deny process of the packet.

The Allow control unit 16 computes the transmission path of the packet, in the case where the action of the policy is "Allow". In detail, the Allow control unit 16 instructs the path computation unit 18 to compute the transmission path to the destination. The Allow control unit 16 notifies the OFS control unit 20 of the computed transmission path.

The Deny control unit 17 determines the Deny process, in the case where the action of the policy is "Deny". That is, the Deny control unit 17 determines the Deny process for the packet for which communication to the destination unit is determined not to be allowed. In detail, when the policy determination unit 15 determines that the action of the policy is an action of not allowing (Deny) communication to the destination unit, the Deny control unit 17 determines a process for the packet for which communication to the destination unit is determined not to be allowed, based on the additional information included in the action. The Deny control unit 17 notifies the OFS control unit 20 of the determined process.

As an example, the Deny control unit 17 may determine that the OFS 30 is to discard (Drop) the received packet, in the case where "Drop" is set as the additional information in the action. By the OFC 10 setting, in the OFS 30, a rule of a process (Drop process) of discarding a specific packet in such a way, a CPU load in the case where the OFS 30 subsequently receives the same packet can be reduced. That is, in the case where the Drop process rule is set in the OFS 30, the OFS 30 can perform the Drop process in a hardware part of the OFS 30, without querying the OFC 10 as to the process of the received packet. This contributes to a reduced CPU load of the OFS 30 and the OFC 10.

As another example, the Deny control unit 17 may determine to set, in the OFS 30, an explicit path to another destination (e.g. an external specific unit) different from the destination unit for the received packet, in the case where information indicating "forwarding to a specific unit" is set as the additional information in the action. In detail, the Deny control unit 17 determines that the OFS 30 is to transmit the packet to another destination such as a quarantine network, a honeypot, and a detailed flow behavior analysis unit. In this case, the Deny control unit 17 instructs path computation unit 18 to compute transmission paths to the plurality of such security analysis units. Here, the Deny control unit 17 may determine to transmit the packet to one of the plurality of units, or determine to transmit the packet to the plurality of units. The destination to which the Deny control unit 17 determines to transmit the packet is defined beforehand according to the match condition. In the case where the number of destinations is one, the same destination is specified in all match conditions.

For instance, in the case where the policy only includes a static default VLAN setting, the OFC 10 cannot explicitly set the path or adaptively set the path, in the OFS 30. However, since the action is determined according to the policy as described above, the OFC 10 can set, in the OFS 30, the explicit path or the adaptive path for the packet for which communication to the destination unit is not allowed. In addition, a more detailed Deny process can be provided from an external unit.

The Deny control unit 17 may also determine that, when the OFS 30 receives the packet which is determined to be discarded or the packet for which the explicit path is determined to be set, the OFS 30 is to transmit the information of the packet to the OFC 10 again. In detail, the Deny control unit 17 may determine to cause the OFS 30 to discard (Drop) the received packet and also determine to cause the OFS 30 to transmit (Packet-in) the information of the packet to the OFC 10, in the case where a setting (logging setting) of keeping a log is made in the additional information. Alternatively, the Deny control unit 17 may set the explicit path of the received packet in the OFS 30 and also determine to cause the OFS 30 to transmit (Packet-in) the information of the packet to the OFC 10.

By causing the OFS 30 to transmit, to the OFC 10, the information of the packet for which communication to the destination unit is not allowed in this way, the OFC 10 can recognize the contents of the packet. Besides, the below-mentioned Deny log creation unit 19 can create log information based on the received information of the packet.

The above describes the case where the Deny control unit 17 determines the Deny process based on the additional information included in the action corresponding to the identification information. However, the method of determining the Deny process by the Deny control unit 17 is not limited to the method based on the identification information. For instance, the Deny control unit 17 may determine a predetermined process as the Deny process.

The packet for which communication to the destination unit is not allowed might be discarded after a predetermined time elapses, as a result exhibiting the same behavior as the Drop process in the Deny process. Here, if no control is exercised on such a packet, it is impossible to perform a process other than Drop, such as a process whereby the OFS 30 forwards the packet to a specific unit or a process whereby the OFC 10 keeps a log. In this exemplary embodiment, however, when the policy determination unit 15 determines the action of the policy as the action of not allowing communication to the destination unit, the Deny control unit 17 determines the Deny process based on the policy. This enables the OFC 10 to set, in the OFS 30, a switch action of suppressing forwarding of the packet for which communication to the destination unit is not allowed (i.e. a process for suppressing forwarding to the destination unit).

The path computation unit 18 computes a path when transmitting the packet to the destination in the payload or the unit indicated by the policy. For example, the path computation unit 18 computes information sequentially indicating each OFS 30 and its output port via which the packet arrives at the destination in the payload or the specific unit indicated by the policy. The path computation unit 18 may compute the path to the destination unit, based on a shortest path algorithm. The path computation method, however, is not limited to the method based on the shortest path algorithm. Since the method of computing the path to the destination unit is widely known, its description is omitted here. The path computation unit 18 may compute a plurality of path candidates, instead of only one path candidate.

Note that a path can be regarded as sequentially indicating each unit (e.g. switch) and its output port via which a flow arrives at its destination. Take, for example, a path where the received packet is first transmitted from "output port 1" of switch A to switch B, then transmitted from "output port 3" of switch B to switch C, and further output from "output port 4" of switch C. Such a path can be expressed as "switch A, output port 1→switch B, output port 3→switch C, output port 4".

The Deny log creation unit 19 creates a log (hereafter referred to as "Deny log") when performing the Deny process. Hence, the Deny log can be regarded as a log indicating determination that communication to the destination unit is not allowed. There is also the case where the Deny control unit 17 determines to cause the OFS 30 to transmit the information of the packet discarded or the information of the packet for which the explicit path is set, to the OFC 10 again. In this case, the Deny log creation unit 19 may create the Deny log, upon receiving such packet information from the OFS 30.

For example, the Deny log creation unit 19 may create the Deny log as "2009/08/11 12:00:01 Deny TCP SRC: 192.168.1.3: 49388 DST: xxx.xxx.xxx.xxx: 80". This example of the Deny log weans "a packet transmitted from a unit whose source IP address is "192.168.1.3 (port number 49388)" to a destination whose IP address is "xxx.xxx.xxx.xxx (port number 80)" is Deny-processed at 12:00:01 on Aug. 11, 2009". Note that, in the case where the OFC 10 does not output a log, the OFC 10 does not need to include the Deny log creation unit 19.

The above describes an example where the Deny log includes a date or a part (e.g. an IP address and the like) of the payload information of the packet. The information included in the Deny log, however, is not limited to the above. The Deny log may include other information in the payload information of the packet. Besides, the log output from the Deny log creation unit 19 is not limited to the Deny log. For instance, the output log may include a log (hereafter referred to as "Allow log") indicating that communication to the destination unit is allowed (Allow). As an example, suppose communication of a packet transmitted to a destination indicated by "xxx.xxx.xxx.xxx (port number 80)" is allowed (Allow) at 12:00:01 on Aug. 11, 2009. In this case, the Deny log creation unit 19 may create the Allow log as "2009/08/11 12:00:01 Allow TCP SRC: 192.168.1.3: 49388 DST: xxx.xxx.xxx.xxx: 80".

The OFS control unit 20 sets a process rule that is executed by the OFS 30, based on the transmission path of the packet computed by the Allow control unit 16 or the Deny process determined by the Deny control unit 17. That is, upon receiving the Deny process determined by the Deny control unit 17, the OFS control unit 20 sets a rule of executing the Deny process, in the OFS 30 receiving the packet. Here, the OFS control unit 20 may determine the OFS 30 transmitting the information of the packet to the OFC 10, as the setting target switch. Note that the switch in which the OFS control unit 20 sets the process rule is not limited to the OFS 30 receiving the packet. Upon receiving the transmission path of the packet computed by the Allow control unit 16, the OFS control unit 20 sets a rule, of forwarding the packet on the transmission path, in the OFS 30.

An operation of the OFS control unit 20 is described in detail below. First, the OFS control unit 20 receives a notification of the transmission path of the packet computed by the Allow control unit 16 or the Deny process determined by the Deny control unit 17. In the case of receiving the transmission path of the packet computed by the Allow control unit 16, the OFS control unit 20 creates a flow that associates the information of the payload of the packet as the identification information with the transmission path of the packet as the action. In the case of receiving the Deny process determined by the Deny control unit 17, on the other hand, the OFS control unit 20 creates a flow that associates the information of the payload of the packet as the identification information with the Deny process as the action. The OFS control unit 20 then creates a message for updating the storage unit 32 of the OFS 30 with information of the created flow, and instructs the OFP transmission unit 21 to transmit the message to the OFS 30.

For instance, the OFS control unit 20 sets the Deny process in the following cases. As an example, in the case where the Deny control unit 17 determines to explicitly set paths to a plurality of security analysis units, the OFS control unit 20 performs a setting of updating the output port of the packet for a flow stored in one OFS 30 or a plurality of OFSs 30, according to the paths. As another example, in the case where the Deny control unit 17 determines to drop the received packet, the OFS control unit 20 performs a setting of discarding the packet for a flow in the OFS 30 (also referred to as "ingress") transmitting the packet.

There is also the case where the Deny control unit 17 determines to cause the OFS 30 to transmit the packet which is determined to be Dropped or the packet for which the explicit path is determined to be set, to the OFC 10 again. In this case, the OFS control unit 20 sets a virtual port "Controller" and also performs a setting of transmitting (Packet-in) the packet, for a flow in the OFS 30 (i.e. ingress) transmitting the packet.

A "Flow Mod message" is used in the case where the controller requests the switch to register, change, or delete a flow on the Secure Channel in OpenFlow. Accordingly, the OFS control unit 20 may set a flow in the OFS 30, by using the Flow Mod message.

The OFP transmission unit 21 transmits a message based on the OFP, to the OFS 30. In detail, the OFF transmission unit 21 transmits a message created by the OFS control unit 20 based on the OFF, the OFS 30.

The OFP reception unit 11, the static policy acquisition unit 13, the dynamic policy acquisition unit 14, the policy determination unit 15, the Allow control unit 16, the Deny control unit 17, the path computation unit 18, the Deny log creation unit 19, and the OFS control unit 20 are realized by a CPU of a computer operating according to a program (relay control program). For example, the program may be stored in a storage unit (not shown) in the OFC 10, with the CPU reading the program and, according to the program, operating as the OFP reception unit 11, the static policy acquisition unit 13, the dynamic policy acquisition unit 14, the policy determination unit 15, the Allow control unit 16, the Deny control unit 17, the path computation unit 18, the Deny log creation unit 19, and the OFS control unit 20. The OFP reception unit 11, the static policy acquisition unit 13, the dynamic policy acquisition unit 14, the policy determination unit 15, the Allow control unit 16, the Deny control unit 17, the path computation unit 18, the Deny log creation unit 19, and the OFS control unit 20 may also be each realized by dedicated hardware.

The following describes an operation. The following first describes processing in the case where the OFC 10 receives information of a packet from the OFS 30, and then describes processing caused by updating of a policy stored in the policy table 12.

Figure 3:
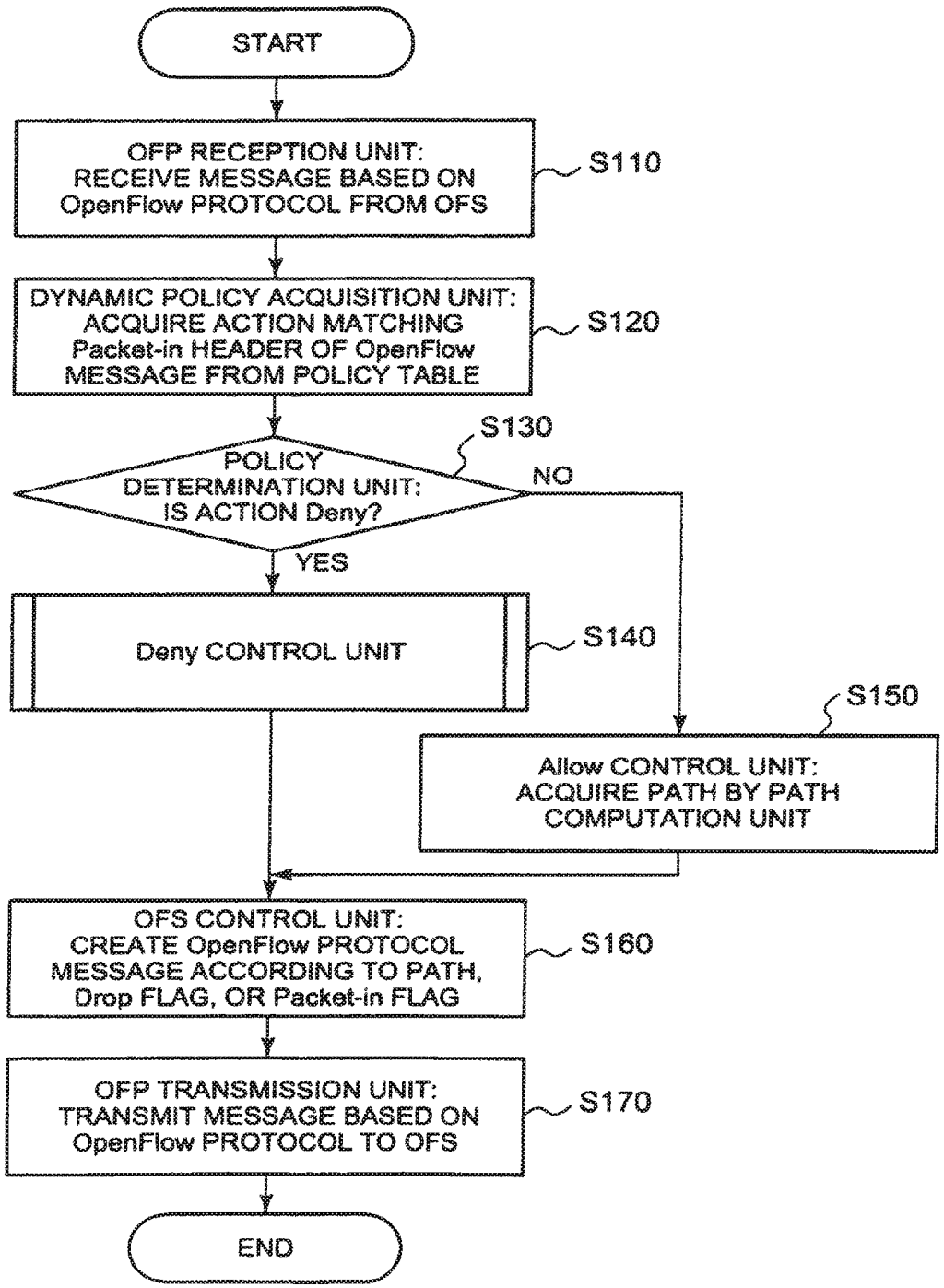
FIG. 3 is a flowchart showing an example of processing in the case of receiving information of a packet.

FIG. 3 is a flowchart showing an example of processing in the case where the OFC 10 receives information of a packet from the OFS 30. First, when the OFS 30 receives a packet having no corresponding flow in the storage unit 32, the control unit 33 in the OFS 30 transmits a message including information of the received packet to the OFC 10, via the network interface unit 31.

When the OFP reception unit 11 receives the message based on the OFP from the OFS 30 (step 110), the dynamic policy acquisition unit 14 acquires an action that matches a Packet-in header in the OpenFlow message, from the policy table 12 (step S120). That is, the dynamic policy acquisition unit 14 compares the received information of the packet with each match condition stored in the policy table 12, and reads an action corresponding to a match condition met by the received information of the packet, from the policy table 12. The policy determination unit 15 determines whether or not the action read by the dynamic policy acquisition unit 14 is an action of "not allowing (Deny) communication to the destination unit" (step S130). In the case where the action is Deny (step S130: "YES"), the policy determination unit 15 instructs the Deny control unit 17 to determine a Deny process of the packet (step S140).

Figure 4:
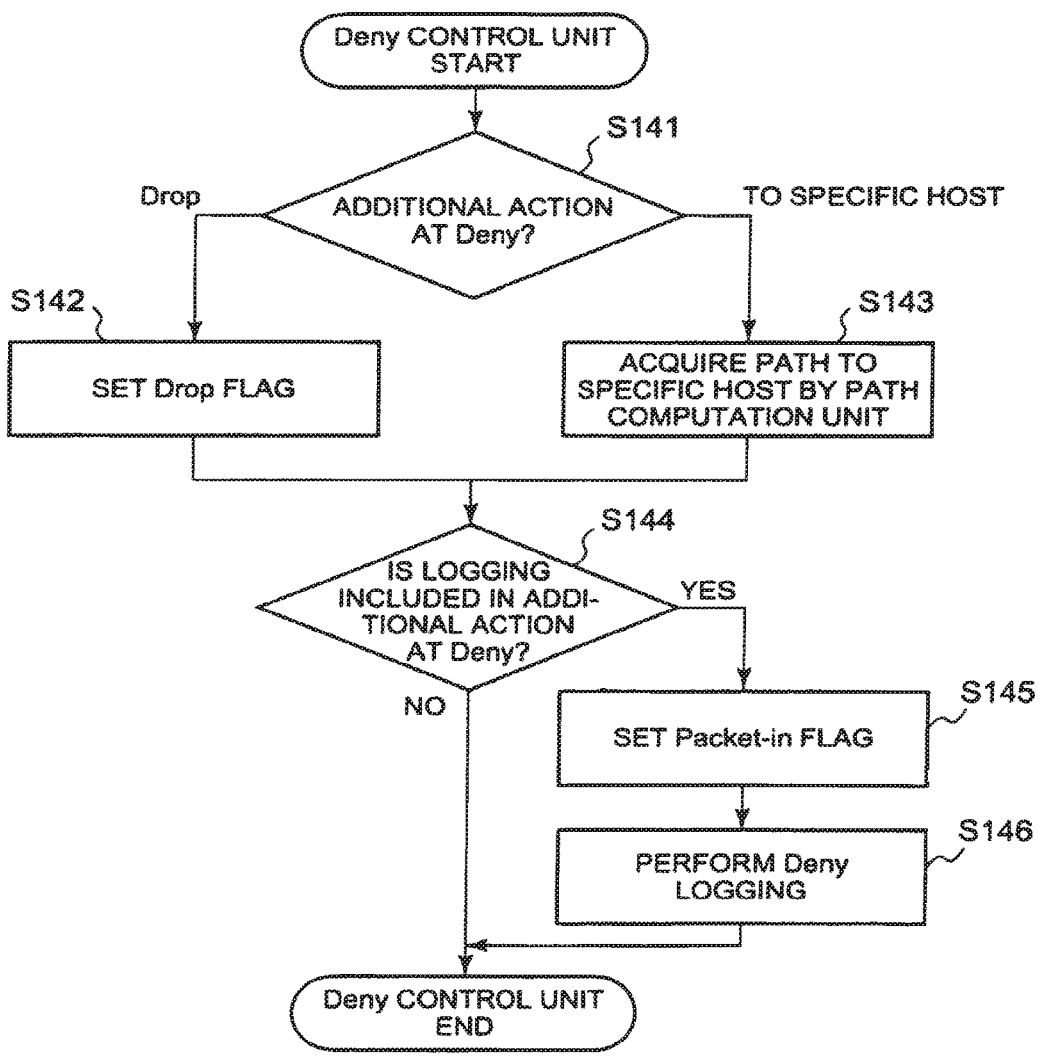
FIG. 4 is a flowchart showing an example of processing performed by a Deny control unit 17.

FIG. 4 is a flowchart showing an example of processing performed by the Deny control unit 17. First, the Deny control unit 17 determines the process, based on additional information included in the action (step S141). In the case where the additional information indicates "Drop" (step S141: "Drop"), the Deny control unit 17 sets a Drop flag (step S142). In detail, the Deny control unit 17 stores the setting of the Drop flag, in a memory (not shown) or the like in the OFC 10. In the case where the additional information indicates to forward the packet to a specific host (i.e. forward to a specific unit) (step S141: "to specific host"), on the other hand, the Deny control unit 17 instructs the path computation unit 18 to compute a transmission path of the packet to the specific host (step S143).

The Deny control unit 17 also determines whether or not the logging setting is made in the additional information (step S144). In the case where the logging setting is made (step S144: "YES"), the Deny control unit 17 sets a Packet-in flag (step S145). In detail, the Deny control unit 17 stores the setting of the Packet-in flag, in a memory (not shown) or the like in the OFC 10. Following this, the Deny log creation unit 19 creates a Deny log (Deny logging) (step S146). In the case where the logging setting is not made (step S144: "NO"), the Deny control unit 17 does not perform the Deny log creation process.

In the case where the action is not Deny in step S130 in FIG. 3 (step S130: "NO"), the policy determination unit 15 instructs the Allow control unit 16 to compute a forwarding destination of the packet (step S150). In detail, the Allow control unit 16 instructs the path computation unit 18 to compute a path of the packet. The Allow control unit 16 thus acquires the path.

After the process by the Deny control unit 17 (step S140) or the path computation process by the Allow control unit 16 (step S150), the OFS control unit 20 creates a message based on the OFP, using the transmission path, the Drop flag, or the Packet-in flag (step 160). In detail, the OFS control unit 20 creates a message for updating a flow stored in the storage unit 32 in the OFS 30, based on the transmission path of the packet computed by the Allow control unit 16 or the Deny process determined by the Deny control unit 17, as well as the Drop flag or the Packet-in flag. The OFP transmission unit 21 transmits the message created by the OFS control unit 20 based on the OFP, to the OFS 30 (step S170).

Thus, the reception of the information of the packet from the OFS 30 causes the flow to be determined (that is, the OFS 10 creates the entry to be stored in the storage unit 32 in the OFS 30, after actually receiving the packet), which produces an advantageous effect of reducing the number of flow entries stored in the storage unit 32.

Figure 5:
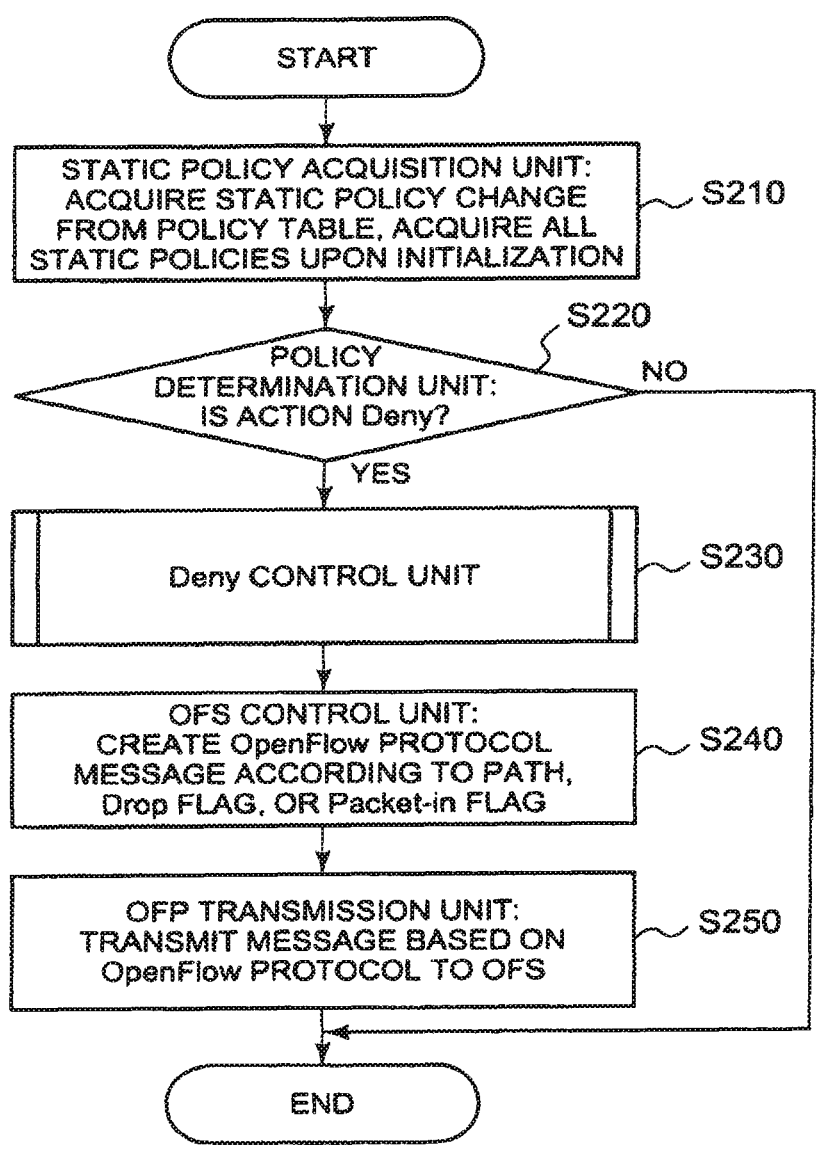
FIG. 5 is a flowchart showing an example of processing caused by updating of a policy.

Processing caused by updating of a policy stored in the policy table 12 is described next. FIG. 5 is a flowchart showing an example of this processing. Upon receiving information indicating that the OFS 30 is connected to the communication network or detecting an update in the policy table 12, the static policy acquisition unit 13 reads an updated policy from the policy table 12. Moreover, upon detecting initialization of the policy table 12, the static policy acquisition unit 13 reads all policies in the policy table 12 (step S210). Having read the updated policy, the static policy acquisition unit 13 notifies the policy determination unit 15 of the policy.

The policy determination unit 15 determines whether or not an action included in the policy received from the static policy acquisition unit 13 is an action of "not allowing (Deny) communication to the destination unit" (step S220). In the case where the action is not Deny (step S220: "NO"), the policy determination unit 15 ends the processing. In the case where the action is Deny (step S220: "YES"), on the other hand, the policy determination unit 15 instructs the Deny control unit 17 to determine a Deny process of the packet (step S230). Subsequent processing from when the Deny control unit 17 determines the Deny process to when the OFP transmission unit 21 transmits a message created by the OFS control unit 20 based on the OFP to the OFS 30 (steps S230 to S250) is the same as the processing of steps S140 and S160 to S170 shown as an example in FIG. 3, and so its description is omitted.

Thus, the updating of the policy stored in the policy table 12 causes the flow to be determined (that is, the OFC 10 creates the entry to be stored in the storage unit 32 in the OFS 30, when the policy is updated), which produces an advantageous effect of reducing a load because the OFC 10 can reduce access from the OFS 30.

As described above, according to the present invention, the policy determination unit 15 determines, using information of a packet received by the OFS 30, whether to allow or not to allow communication to a destination unit for the packet that meets a match condition, based on a policy. On condition that the policy determination unit 15 determines not to allow (Deny) communication to the destination unit for the packet that meets the match condition, the Deny control unit 17 determines a process for suppressing forwarding of the packet to the destination unit, and the OFS control unit 20 sets, at least in the OFS 30 receiving the packet, a process rule of executing the process. This contributes to a reduced load of processing performed by a packet relay unit (e.g. the OFS 30) on a packet for which communication to a destination unit is not allowed (Deny).

Moreover, the Deny control unit 17 and the OFS control unit 20 set a process rule for discarding (Drop) the packet that meets the match condition, in the OFS 30. This contributes to a reduced CPU load of the OFS 30 and the OFC 10.

Besides, the Deny control unit 17 and the OFS control unit 20 set a process rule (e.g. a path to another destination) for transmitting the packet that meets the match condition to another destination different from the destination unit, in the OFS 30. This enables a more detailed Deny process to be provided from an external unit.

Furthermore, the Deny control unit 17 and the OFS control unit 20 set a rule for transmitting, when the OFS 30 receives the Deny packet, the information of the packet to the OFC 10, in the OFS 30. In this case, when the OFC 10 receives the information of the packet from the OFS 30, the Deny log creation unit 19 creates a log. This enables a communication status of the Deny packet to be recognized.

Second Exemplary Embodiment

Figure 6:
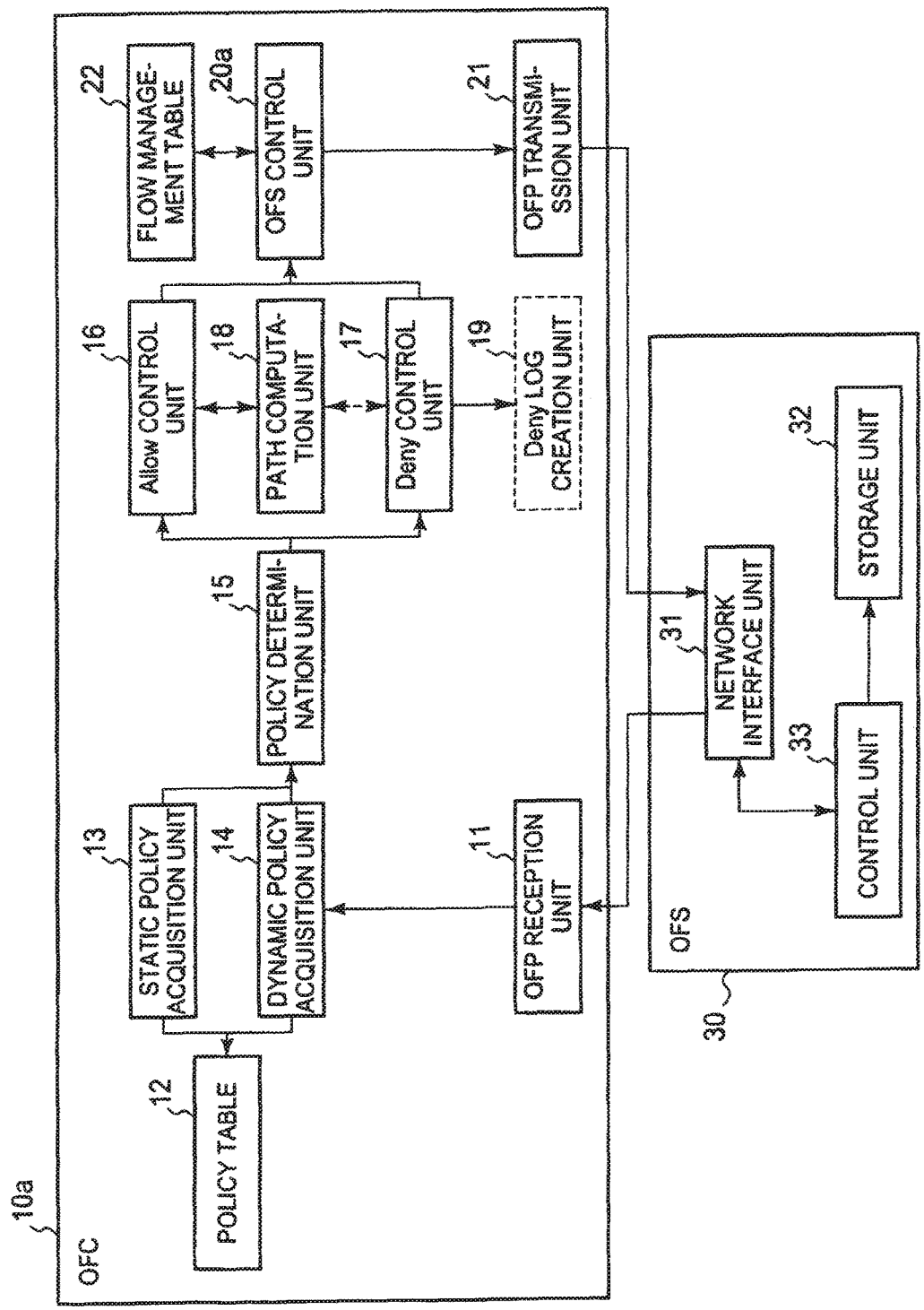
FIG. 6 is a block diagram showing an example of a relay control system in a second exemplary embodiment.

FIG. 6 is a block diagram showing an example of a relay control system in a second exemplary embodiment of the present invention. The same structures as the first exemplary embodiment are given the same reference signs as in FIG. 1, and their description is omitted. The relay control system in this exemplary embodiment includes an OFC 10a and the OFS 30. The OFS 30 is the same as that in the first exemplary embodiment.

The OFC 10a includes the OFP reception unit 11, the policy table 12, the static policy acquisition unit 13, the dynamic policy acquisition unit 14, the policy determination unit 15, the Allow control unit 16, the Deny control unit 17, the path computation unit 18, the Deny log creation unit 19, an OFS control unit 20a, and the OFP transmission unit 21. In addition, the OFC 10a includes a flow management table 22. That is, the OFC 10a differs from the OFC 10 in the first exemplary embodiment in that the OFS control unit 20a is included instead of the OFS control unit 20, and also the flow management table 22 is included. The other structures are the same as the first exemplary embodiment.

The flow management table 22 stores an action (hereafter referred to as "OF action") of a flow created by the OFS control unit 20. That is, the flow management table 22 stores a rule set in the OFS 30. For example, the flow management table 22 is realized by a magnetic disk unit or the like included in the OFC 10a. The flow management table 22 may store the OF action and information (hereafter referred to as "switch identification information") identifying the OFS 30 as the flow update target, in association with each other.

The OFS control unit 20a stores the created OF action in the flow management table 22. Having newly creating the OF action, the OFS control unit 20a determines whether or not the same OF action is already stored in the flow management table 22. In the case where the same OF action is already stored, the OFS control unit 20a discards the created OF action so that no message is transmitted from the OFP transmission unit 21. That is, in the case where a rule to be set in the OFS 30 is already stored in the flow management table 22, the OFS control unit 20a does not set the rule in the OFS 30. In the case where the created OF action is different from the stored OF action, the OFS control unit 20a updates the flow management table 22 with the created OF action. Functions of the OFS control unit 20a other than the above-mentioned function are the same as those of the OFS control unit 20 in the first exemplary embodiment.

The OFS control unit 20a is realized by a CPU of a computer operating according to a program (relay control program). The OFS control unit 20a may also be realized by dedicated hardware.

Figure 7:
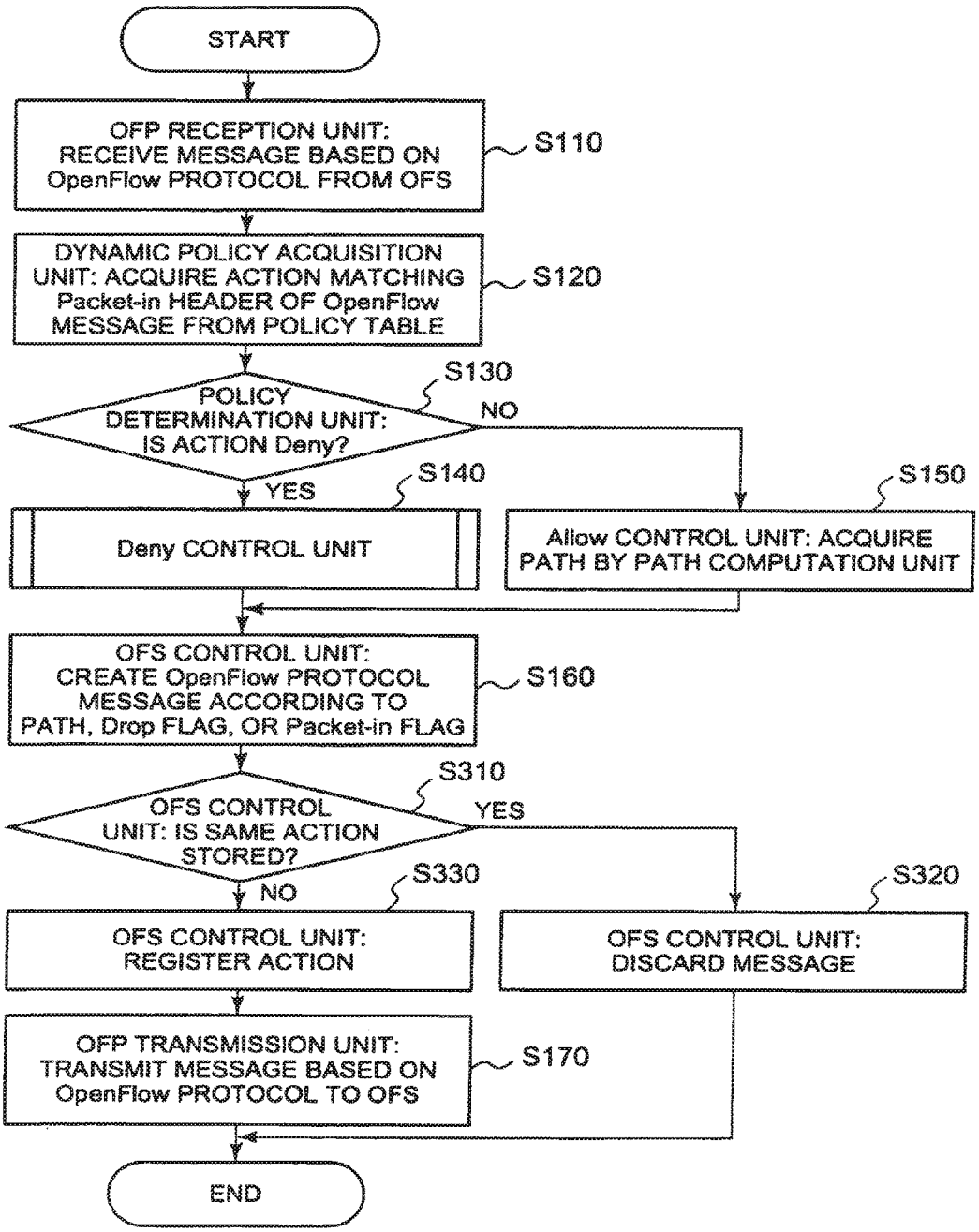
FIG. 7 is a flowchart showing an example of processing in the case of receiving information of a packet.

The following describes an operation. FIG. 7 is a flowchart showing an example of processing in the case where the OFC 10a receives information of a packet from the OFS 30 in the second exemplary embodiment. Processing from when the OFC 10a receives the information of the packet from the OFS 30 to when the OFS control unit 20a creates a message based on the OFP is the same as the processing of steps S110 to S160 shown as an example in FIG. 3.

Having created the message based on the OFP, the OFS control unit 20a determines whether or not the same OF action is stored in the flow management table 22 (step S310). In the case where the same OF action is already stored in the flow management table 22 (step S310: "YES"), the OFS control unit 20a discards the created message (step S320), and ends the processing. In the case where the same OF action is not stored in the flow management table 22 (step S310: "NO"), the OFS control unit 20a stores the created OF action in the flow management table 22 (step S330). Following this, the OFP transmission unit 21 transmits the message created by the OFS control unit 20a based on the OFP, to the OFS 30 (step S170).

As described above, according to this exemplary embodiment, when the OFS control unit 20a sets a process rule in the OFS 30, the OFS control unit 20a also stores the process rule in the flow management table 22. Subsequently, when the policy determination unit 15 determines not to allow (Deny) communication to a destination unit for a packet that meets a match condition, in the case where a process rule to be set in the OFS 30 is already stored in the flow management table 22, the OFS control unit 20a does not set the process rule in the OFS 30. In this way, a resetting instruction for an already set process rule can be prevented, which contributes to a reduced CPU load of the OFS 30 and the OFC 10a.

For example, in the case where the OFS 30 performs only the Drop process on the Deny packet, the OFC 10a does not receive the Deny packet from the OFS 30 again. If Packet-in is set for the Deny packet, however, the packet for which communication is not allowed (Deny) will end up being transmitted to the OFC 10a again. In this exemplary embodiment, even when the Deny packet is transmitted to the OFC 10a again, the OFS control unit 20a suppresses the already set flow updating. This contributes to a reduced processing load on the OFC 10a and the OFS 30.

In other words, when the policy includes the action indicating the Drop process and the Packet-in process for the Deny packet or the explicit path setting and the Packet-in process for the Deny packet, the OFC 10a can be prevented from writing the already written flow action to the storage unit 32 in the OFS 30 a plurality of times.

Third Exemplary Embodiment

Figure 8:
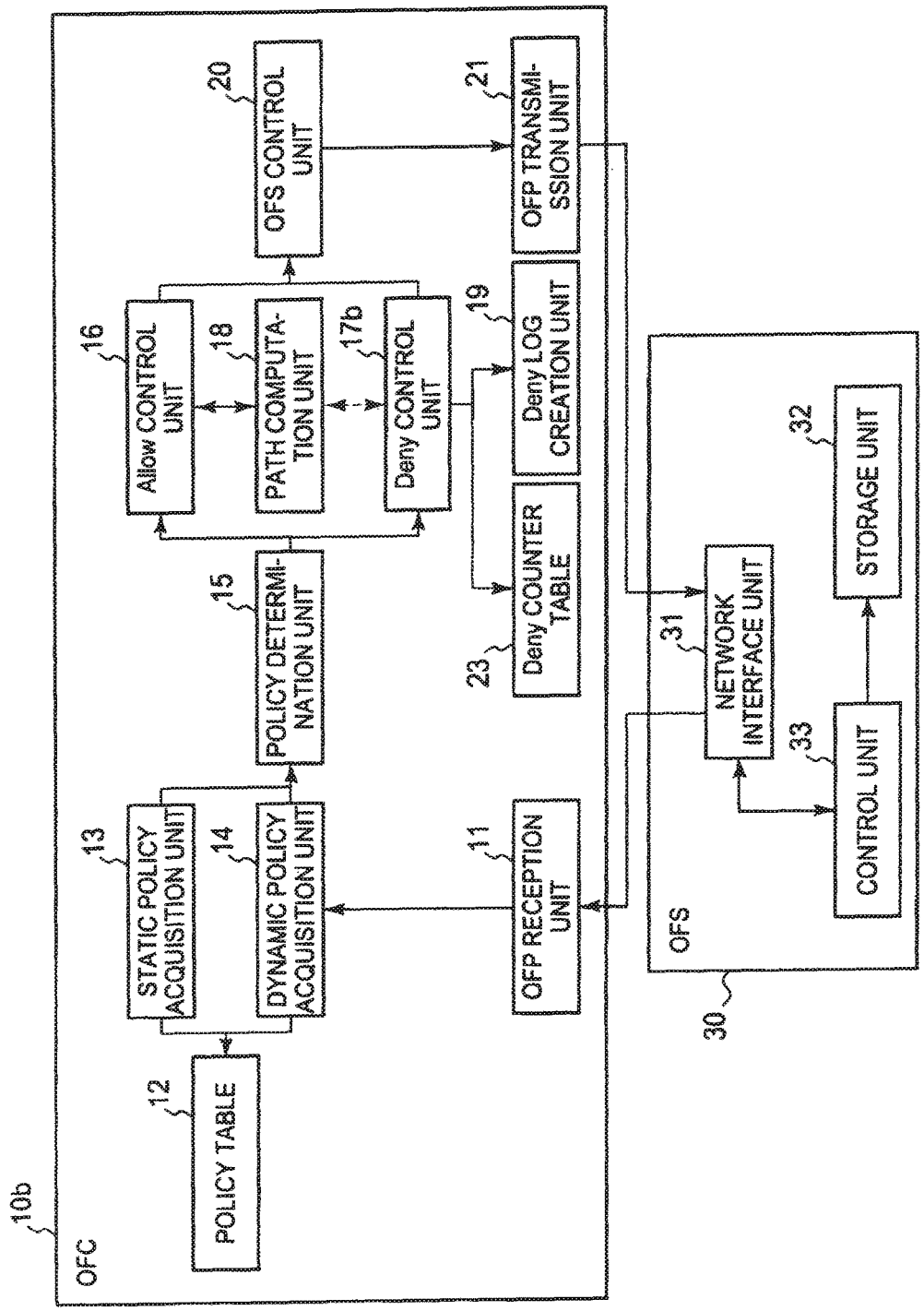
FIG. 8 is a block diagram showing an example of a relay control system in a third exemplary embodiment.

FIG. 8 is a block diagram showing an example of a relay control system in a third exemplary embodiment of the present invention. The same structures as the first exemplary embodiment are given the same reference signs as in FIG. 1, and their description is omitted. The relay control system in this exemplary embodiment includes an OFC 10b and the OFS 30. The OFS 30 is the same as that in the first exemplary embodiment.

The OFC 10*b* includes the OFP reception unit 11, the policy table 12, the static policy acquisition unit 13, the dynamic policy acquisition unit 14, the policy determination unit 15, the Allow control unit 16, a Deny control unit 17*b*, the path computation unit 18, the Deny log creation unit 19, the OFS control unit 20, and the OFP transmission unit 21. In addition, the OFC 10*b* includes a Deny counter table 23. That is, the OFC 10*b* differs from the OFC 10 in the first exemplary embodiment in that the Deny control unit 17*b* is included instead of the Deny control unit 17, and also the Deny counter table 23 is included. The other structures are the same as the first exemplary embodiment.

The Deny counter table 23 stores the number (also referred to as "counter value") of determinations for a packet for which the Deny control unit 17*b* determines not to allow communication to a destination unit, in association with identification information (e.g. match condition) of the packet. This identification information is hereafter also referred to as "field". The counter value can be regarded as a count of the number of Packet-in processes. The Deny counter table 23 may store the number of Deny processes and the same information as identification information used in a match condition of a policy, in association with each other. Alternatively, the Deny counter table 23 may store the number of Deny processes and information included in a payload such as a packet source, in association with each other. Moreover, to aggregate counter values, the Deny counter table 23 may store one counter value that is shared between a plurality of flows (match conditions). For example, the Deny counter table 23 is realized by a magnetic disk unit or the like included in the OFC 10*b*.

The Deny control unit 17*b* increases, in the case where an action of a policy is "Deny" (i.e. it is determined not to allow communication to the destination unit), a counter value in the Deny counter table 23 corresponding to a match condition of the policy. In the case where the counter value exceeds a predetermined threshold (hereafter referred to as "Deny process count threshold"), the Deny control unit 17*b* determines that a process (i.e. Packet-in process) of transmitting information of a packet to the OFC 10*b* is not to be performed for a flow that meets the match condition corresponding to the counter value.

That is, in the case where the number of Packet-in processes for a specific flow (e.g. on a policy basis or on a source address basis) determined as Deny exceeds a threshold (Deny process count threshold), the Deny control unit 17*b* determines to cause the OFS 30 to perform only the Drop process or the specific path selection for the specific flow. In so doing, for example in the case where an attack process is carried out on the OFC 10*b*, a Packet-in frequency can be decreased, which contributes to a reduced processing load on the OFS 30 and the OFC 10*b*.

The Deny control unit 17*b* is realized by a CPU of a computer operating according to a program (relay control program). The Deny control unit 17*b* may also be realized by dedicated hardware.

The following describes an operation. In the third exemplary embodiment, processing from when the OFC 10*b* receives information of a packet from the OFS 30 to when the OFP transmission unit 21 transmits a message to the OFS 30 is the same as the processing in the flowchart shown as an example in FIG. 3, but processing performed by the Deny control unit 17*b* is different from the processing performed by the Deny control unit 17 in the first exemplary embodiment. An operation performed by the Deny control unit 17*b* is described below.

Figure 9:
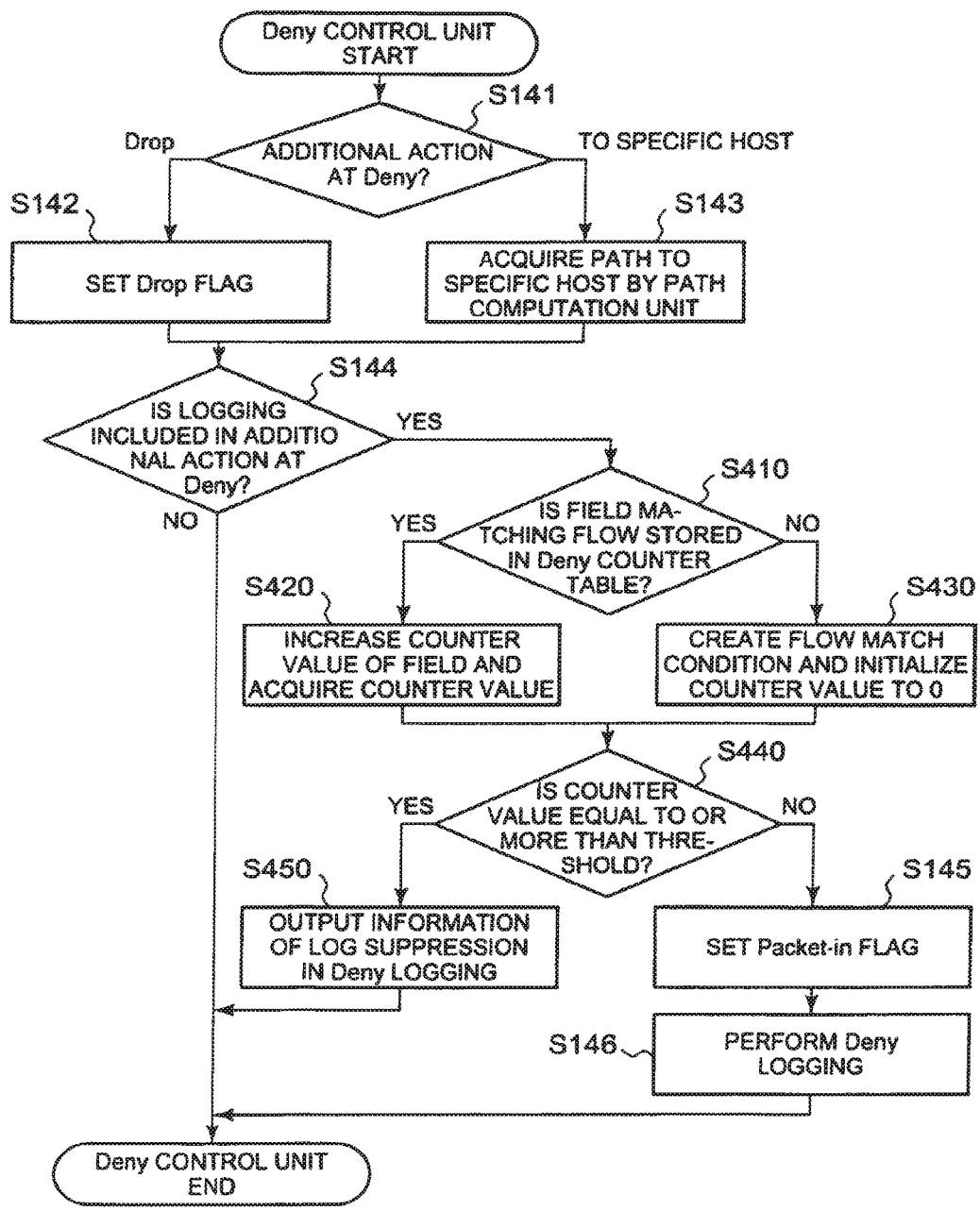
FIG. 9 is a flowchart showing an example of processing performed by a Deny control unit 17*b*.

FIG. 9 is a flowchart showing an example of processing performed by the Deny control unit 17*b*. An operation up to when the Deny control unit 17*b* determines the process based on the additional information included in the action is the same as the operation of steps S141 to S143 in FIG. 4.

Next, the Deny control unit 17*b* determines whether or not the logging setting is made in the additional information (step S144). In the case where the logging setting is not made (step 144: "NO"), the Deny control unit 17*b* does not perform the Deny log creation process. In the case where the logging setting is made (step S144: "YES"), the Deny control unit 17*b* determines whether or not a field matching the flow is stored in the Deny counter table 23 (step S410). In the case where the field matching the flow is stored (step S410: "YES"), the Deny control unit 17*b* increases a counter value corresponding to the field (step S420). For example, the Deny control unit 17*b* adds 1 to the counter value of the field matching the flow in the case where the field matching the flow is not stored (step S410: "NO"), the Deny control unit 17*b* creates a match condition (field) of the flow, and initializes a counter value to 0 (step S430). After increasing the counter value (step S420) or creating the match condition (field) of the flow (step S430), the Deny control unit 17*b* determines whether or not the counter value is equal to or more than the threshold (Deny process count threshold) (step S440). In the case where the counter value is equal to or more than the threshold (step S440: "YES"), the Deny control unit 17*b* instructs the Deny log creation unit 19 to output information indicating that log output is suppressed (step S450). In detail, in the case where the counter value is equal to or more than the threshold, the Deny control unit 17*b* instructs the OFS control unit 20 to create a message, with Packet-in being deleted from the action of the policy. In the case where the counter value is less than the threshold (step S440: "NO"), the Deny control unit 17*b* sets the Packet-in flag and performs Deny logging, as in steps S145 to S146 shown as an example in FIG. 3.

The above describes the case where, in step S440 in FIG. 9, the Deny control unit 17*b* determines whether or not the counter value is equal to or more than the threshold (Deny process count threshold). However, the Deny control unit 17*b* may instead determine whether or not the counter value exceeds the threshold (Deny process count threshold).

As described above, according to this exemplary embodiment, when the policy determination unit 15 determines not to allow (Deny) communication to a destination unit, the Deny control unit 17*b* and the OFS control unit 20 increase the number of determinations for a packet stored in the Deny counter table 23 in association with an element identifying the packet. In the case where the number of determinations for the packet exceeds the Deny process count threshold, the Deny control unit 17*b* and the OFS control unit 20 set a process rule for suppressing transmission of information of the packet to the OFC 10*b*, in the OFS 30. As a result, a situation where information of a packet for which communication is not allowed is notified to the OFC 10*b* an excessive number of times can be prevented.

Fourth Exemplary Embodiment

Figure 10:
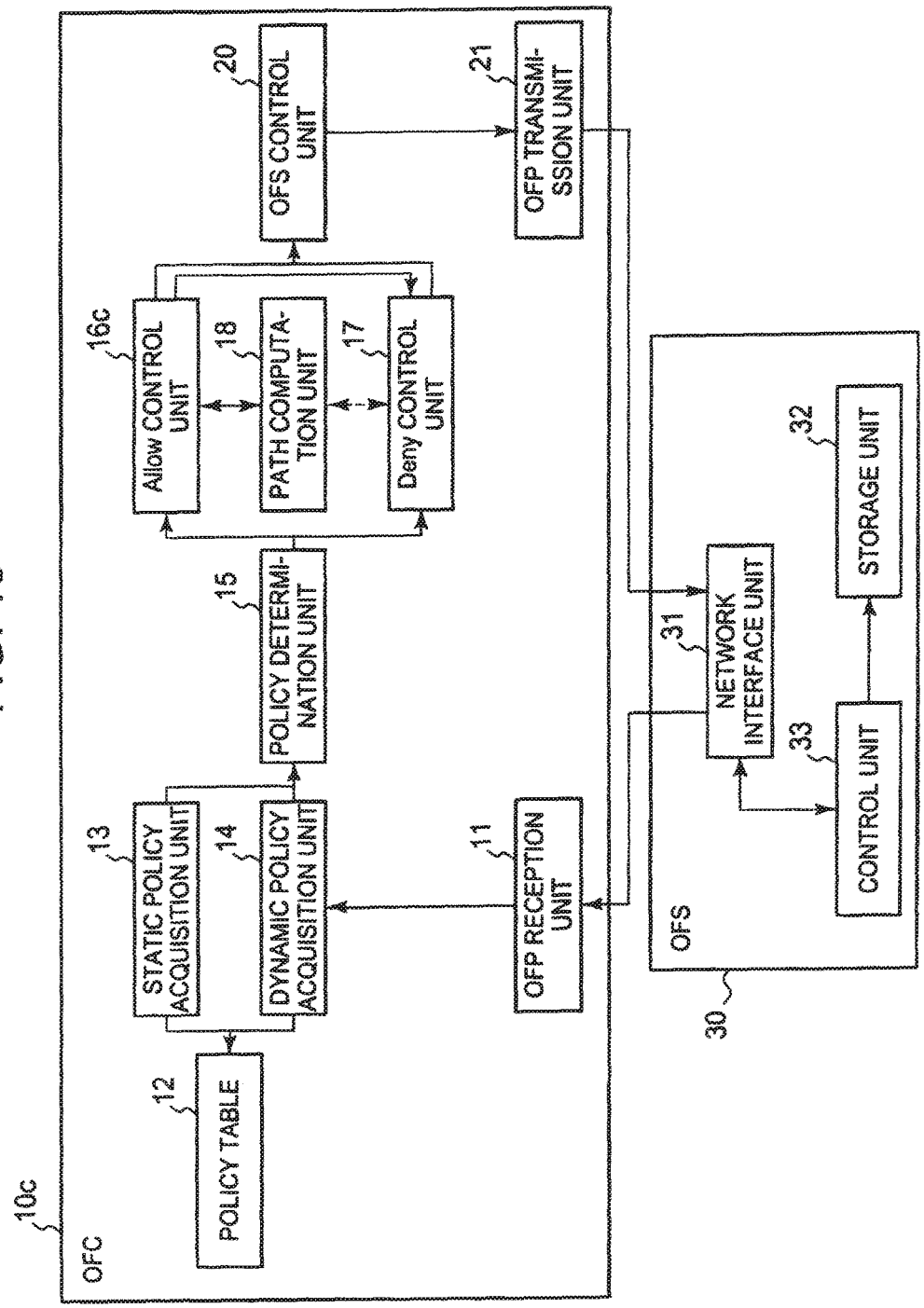
FIG. 10 is a block diagram showing an example of a relay control system in a fourth exemplary embodiment.

FIG. 10 is a block diagram showing an example of a relay control system in a fourth exemplary embodiment of the present invention. The same structures as the first exemplary embodiment are given the same reference signs as in FIG. 1, and their description is omitted. The relay control system in this exemplary embodiment includes an OFC 10*c* and the OFS 30. The OFS 30 is the same as that in the first exemplary embodiment. Though the first exemplary embodiment describes the case where the OFS control unit 20 sets a process rule of executing a Deny process in the OFS 30 (i.e. ingress) receiving packet information, this exemplary embodiment describes the case where the Deny setting is made on an OFS 30 other than the ingress.

The OFC 10c includes the OFP reception unit 11, the policy table 12, the static policy acquisition unit 13, the dynamic policy acquisition unit 14, the policy determination unit 15, an Allow control unit 16c, the Deny control unit 17, the path computation unit 18, the Deny log creation unit 19, the OFS control unit 20, and the OFF transmission unit 21. That is, the OFC 10c differs from the OFC 10 in the first exemplary embodiment in that the Allow control unit 16c is included instead of the Allow control unit 16. The other structures are the same as the first exemplary embodiment.

The Allow control unit 16c computes, in the case where an action of a policy is "Allow" (i.e., it is determined to allow communication to the destination unit), one or more path candidates to a destination unit of a packet. In detail, the Allow control unit 16c instructs the path computation unit 18 to compute a plurality of transmission paths to the destination unit. The Allow control unit 16c then determines, for each computed path, whether or not a switch (hereafter referred to as "Deny switch") that determines not to allow (Deny) communication of the received packet exists on the path. For example, the Allow control unit 16c may query each switch on the path whether to allow or not to allow communication of the packet and, based on a response result, determine whether or not the Deny switch exists.

In the case where the transmission path candidates do not include a path on which the communication of the packet is allowed, the Allow control unit 16c determines to perform the Deny process. In detail, the Allow control unit 16c instructs the Deny control unit 17 to determine the Deny process of the packet. In the case where the transmission path candidates include a path on which the communication of the packet is allowed, the Allow control unit 16e determines not to perform the Deny process, and notifies the OFS control unit 20 of the path.

Note that, in the case of determining that the Deny switch exists on the path, the Allow control unit 16c may determine to set the Deny process in the Deny switch. In this case, the Allow control unit 16c may instruct the Deny control unit 17 to determine the Deny process for the switch on the path, with the OFS control unit 20 instructing the switch on the path to update the flow based on the determined Deny process.

Figure 11:
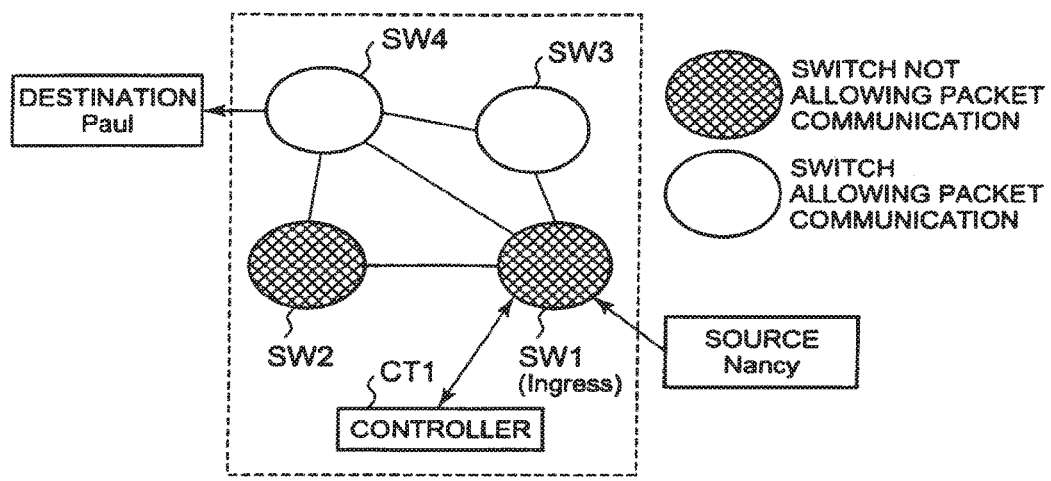
FIG. 11 is an explanatory diagram showing an example where communication is performed from a source to a destination.
Figure 12:
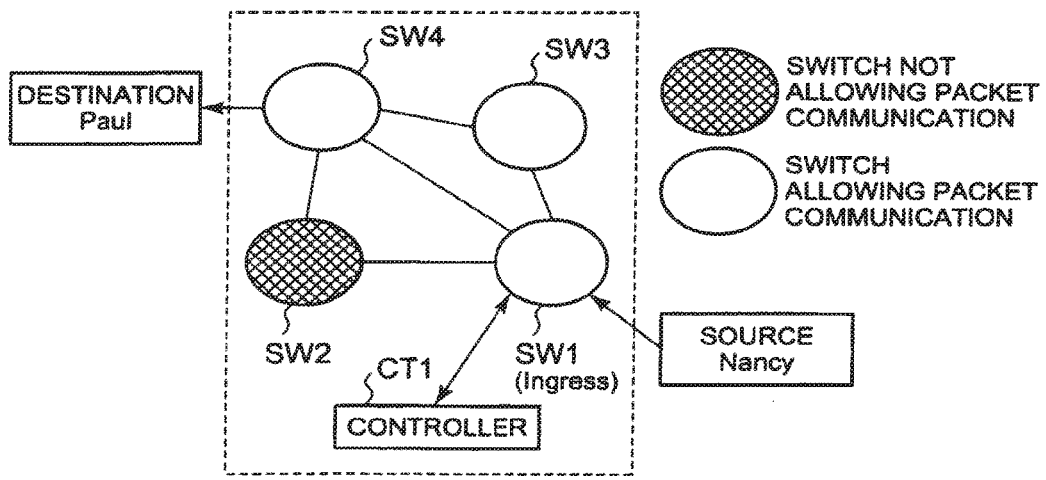
FIG. 12 is an explanatory diagram showing an example where communication is performed from a source to a destination.

The following describes the case where the Deny process is set in the switch on the path, with reference to FIGS. 11 and 12. FIGS. 11 and 12 are explanatory diagrams showing an example where communication is performed from a source (Nancy) to a destination (Paul). A range enclosed with dashed lines is a communication network to which the source (Nancy) and the destination (Paul) are connected. SW1 to SW4 denote switches (e.g. the OFS 30), and CT1 denotes a controller (e.g. the OFC 10c). Among SW1 to SW4, each switch shown by hatching is a switch not allowing communication from the source (Nancy) to the destination (Paul), whereas each itch shown by a white circle is a switch allowing communication from the source (Nancy) to the destination (Paul). In the example shown in FIG. 11, switch to which the source (Nancy) is connected determines not to allow communication to the destination (Paul). Accordingly, the policy determination unit 15 instructs the Deny control unit 17 to determine the Deny process of the packet.

Meanwhile, in the example shown in FIG. 12, a switch to which the source (Nancy) is connected determines to allow communication to the destination (Paul). Accordingly, the policy determination unit 15 instructs the Allow control unit 16c to compute the forwarding destination of the packet. The Allow control unit 16c instructs the path computation unit 18 to compute a plurality of transmission paths to the destination. In the example shown in FIG. 12, three paths to the destination, namely, a path (path 1) via SW1, SW2, and SW4, a path (path 2) via SW1, SW3, and SW4, and a path (path 3) via SW1 and SW4, are computed. The Allow control unit 16c first determines whether or not the Deny switch exists on path 1. SW2 that determines not to allow communication exists on path 1. The Allow control unit 16c then determines whether or not the Deny switch exists on the next path candidate (path 2). No Deny switch exists on path 2. Hence, the Allow control unit 16c notifies the OFS control unit 20 of path 2.

The Allow control unit 16c may also determine to set the Deny process in SW2 on path 1. In this case, the Allow control unit 16c instructs the Deny control unit 17 to determine the Deny process for SW2. The OFS control unit 20 instructs SW2 to update the flow, based on the determined Deny process. Thus, the Deny process can be set beforehand in the switch on the path. Therefore, in the case where a communication unit is connected to a switch in which the Deny process is already set, there is no need to query the OFC 10c again. This contributes to a reduced load on the OFC 10c and the OFS 30 for query.

The Allow control unit 16c is realized by a CPU of a computer operating according to a program (relay control program). The Allow control unit 16c may also be realized by dedicated hardware.

Figure 13:
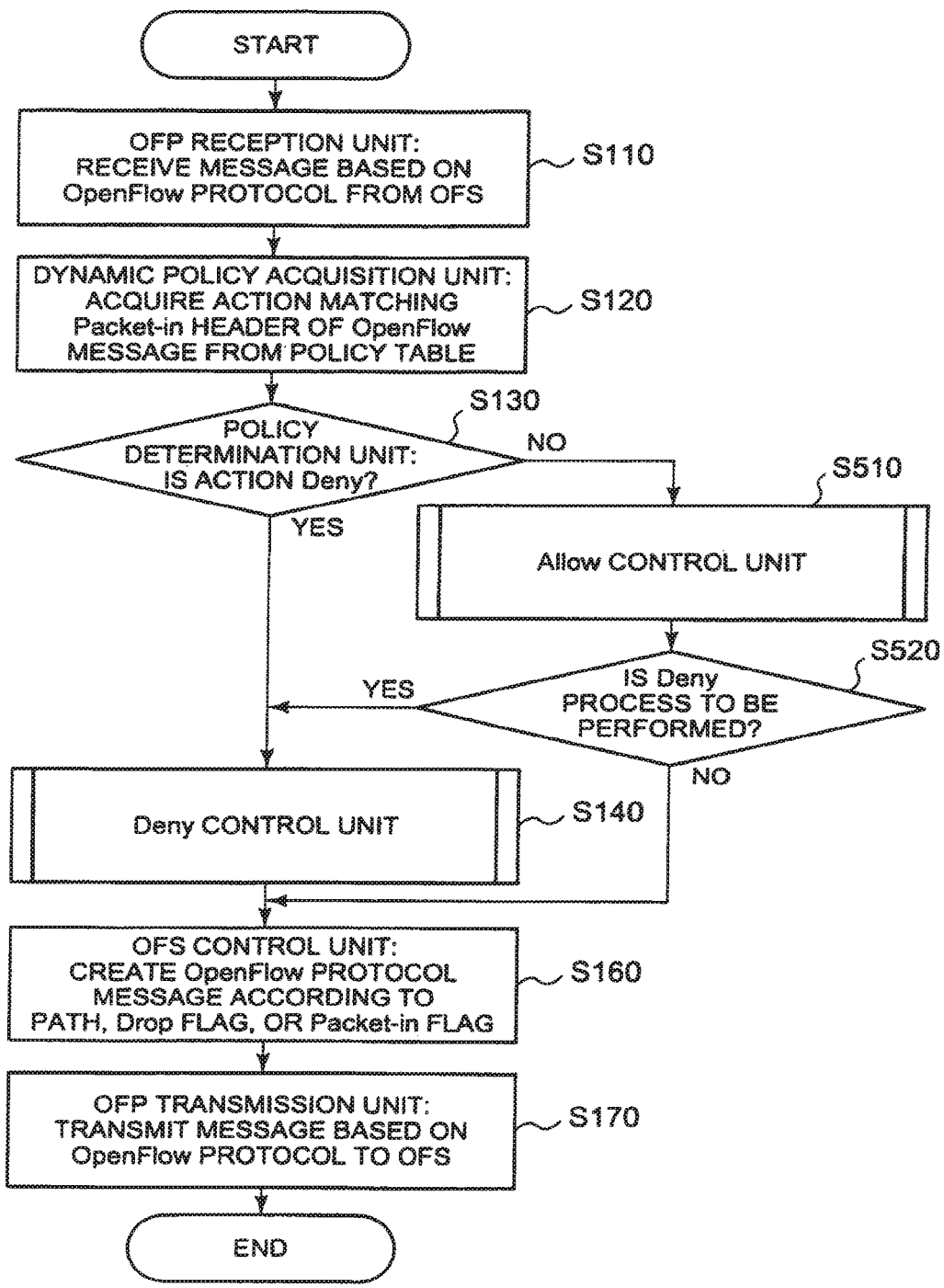
FIG. 13 is a flowchart showing an example of processing in the case of receiving information of a packet.

The following describes an operation. FIG. 13 is a flowchart showing an example of the case where the OFC 10c receives information of a packet from the OFS 30. In the fourth exemplary embodiment, processing in the case where the OFC 10c receives the information of the packet from the OFS 30 and the policy determination unit 15 determines the action as Deny is the same as the processing of steps S110 to S140 and S160 to S170 shown as an example in FIG. 3. Processing (step S510) performed by the Allow control unit 16c in the case where the policy determination, unit 15 determines the action as an action of "allowing (Allow) communication to the destination unit" (step S130 in FIG. 13: "NO") is described below.

Figure 14:
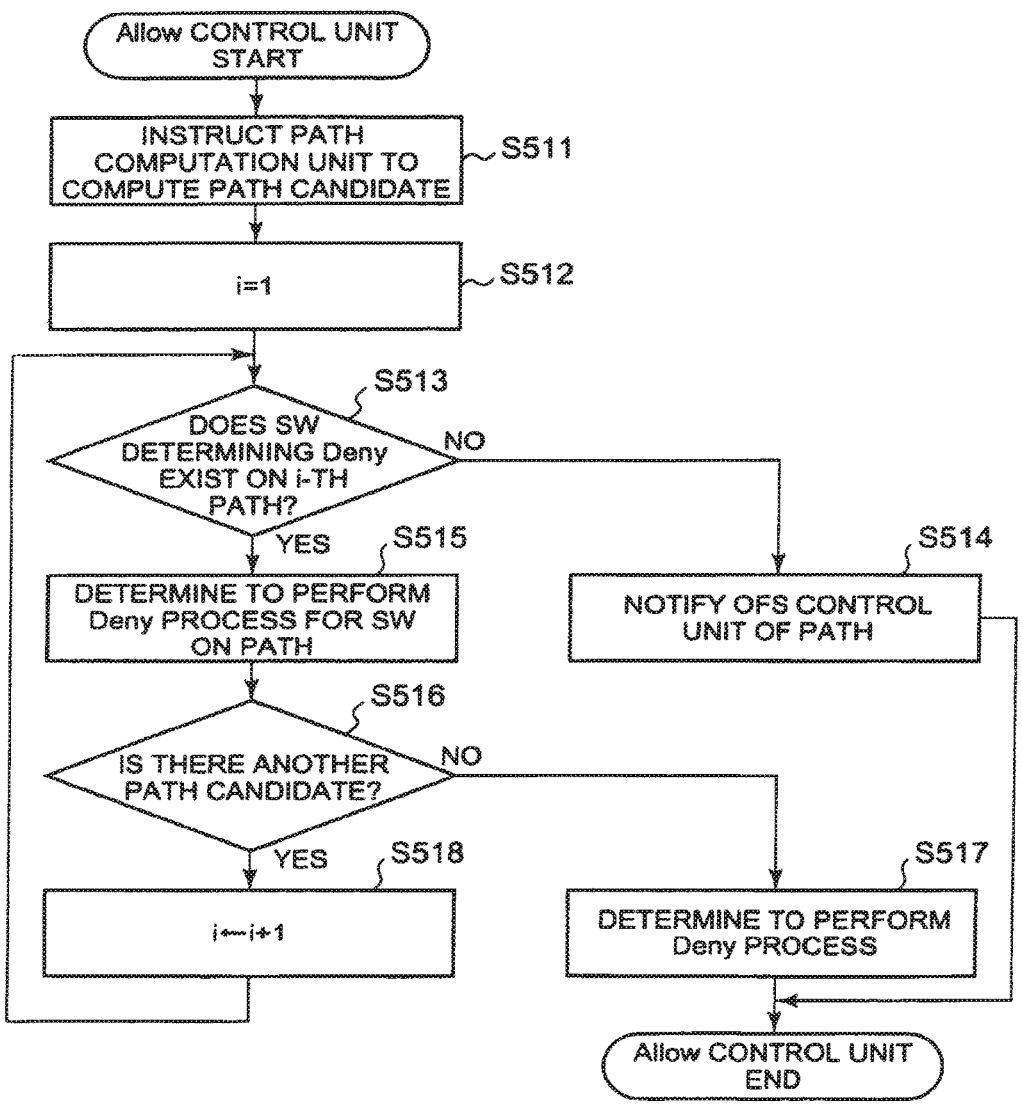
FIG. 14 is a flowchart showing an example of processing performed by an Allow control unit 16*c*.

FIG. 14 is a flowchart showing an example of the processing performed by the Allow control unit 16c. First, the Allow control unit 16c instructs the path computation unit 18 to compute a path candidate (step S511). The Allow control unit 16c performs determination on each computed path candidate in sequence, starting from the first path candidate (step S512). Note that the order of determination is not particularly limited. The Allow control unit 16c determines whether or not the Deny switch exists on the path of the candidate (step S513). In the case where the Deny switch exists (step S513: "YES"), the Allow control unit 16c determines to perform a Deny process on the switch (step S515). The Allow control unit 16c then determines whether or not there is another path candidate (step S516). In the case where there is another path candidate (step S516: "YES"), the Allow control unit 16c repeats the processing of steps S513 and S515 to S518 for each succeeding candidate (step S518). In the case where there is no other path candidate (step S516: "NO"), the Allow control unit 16c determines to perform the Deny process (step S517).

In the case where no Deny switch exists on the path of the candidate in step S513 (step S513: "NO"), the Allow control unit 16c notifies the OFS control unit 20 of the path (step S514).

In FIG. 13, having determined to perform the Deny process (step S520: "YES"), the Allow control unit 16e instructs the Deny control unit 17 to determine the Deny process. Subsequent processing is the same as the processing of steps S140 and S160 to S170 shown as an example in FIG. 3.

The above describes the case where, in the processing shown as an example in FIG. 14, upon detecting the path having no Deny switch, the Allow control unit 16c notifies the OFS control unit 20 of the path, without performing determination on the path of each succeeding candidate. However, even when detecting the path having no Deny switch, the Allow control unit 16c may determine, for each of the remaining path candidates, whether or not the Deny switch exists on the path, and notify the OFS control unit 20 of a subsequently detected path.

As described above, according to this exemplary embodiment, on condition that the policy determination unit 15 determines to allow (Allow) communication to a destination unit for a packet that meets a match condition, the path computation unit 18 computes one or more path candidates to the destination unit of the packet. Following this, the Allow control unit 16c determines whether or not an OFS 30 that determines not to allow communication of the packet exists on the path candidate. In the case where an OFS 30 that determines not to allow communication of the packet exists on each path of all of the path candidates, the Deny control unit 17 and the OFS control unit 20 set a process rule of executing a process (Deny process) for suppressing forwarding of the packet to the destination unit, at least in the OFS 30 receiving the packet. As a result, whether or not transmission is allowed can be determined before the OFS 30 relays the packet to another switch, which contributes to a reduced load on the communication network.

Moreover, in the case where the OFS 30 not allowing communication of the packet that meets the match condition exists on the path, the Deny control unit 17 sets a process rule of executing a process (Deny process) for suppressing forwarding of the packet to the destination unit, in the OFS 30. Thus, the process rule of executing the Deny process can be set not only in the switch (i.e. ingress) transmitting the packet to the controller, but also in the switch on the path candidate. This contributes to a reduced load on the communication network.

Fifth Exemplary Embodiment

Figure 15:
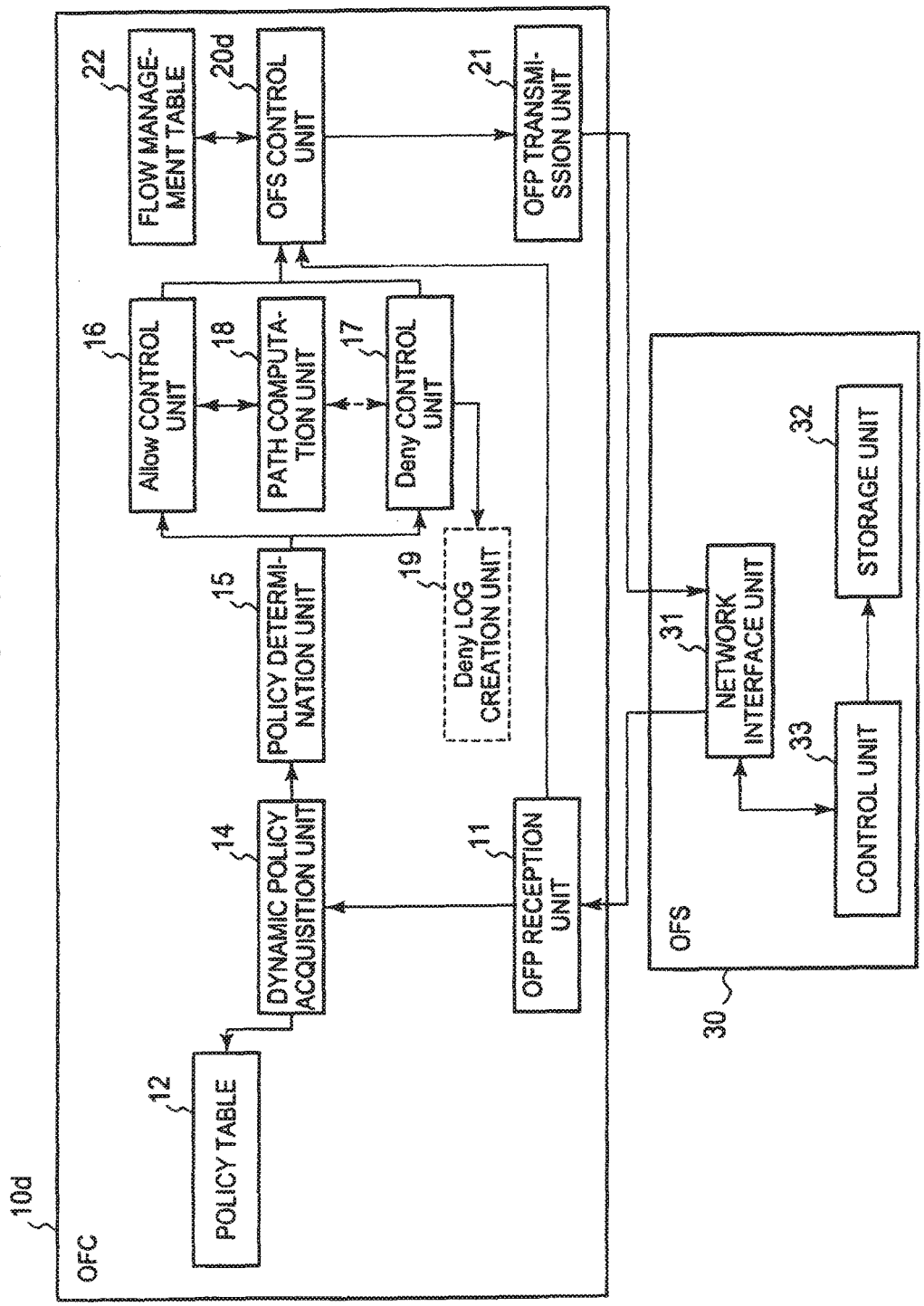
FIG. 15 is a block diagram showing an example of a relay control system in a fifth exemplary embodiment.

FIG. 15 is a block diagram showing an example of a relay control system in a fifth exemplary embodiment of the present invention. The same structures as the second exemplary embodiment are given the same reference signs as in FIG. 6, and their description is omitted. The relay control system in this exemplary embodiment includes an OFC 10d and the OFS 30. The OFS 30 is the same as that in the first exemplary embodiment.

The OFC 10d includes the OFF reception unit 11, the policy table 12, the dynamic policy acquisition unit 14, the policy determination unit 15, the Allow control unit 16, the Deny control unit 17, the path computation unit 18, the Deny log creation unit 19, an OFS control unit 20d, the OFF transmission unit 21, and the flow management table 22. That is, the OFC 10d differs from the OFC 10a in the second exemplary embodiment in that the static policy acquisition unit 13 is not included, and also the OFS control unit 20d is included instead of the OFS control unit 20a. The other structures are the same as the second exemplary embodiment.

In addition to the functions of the OFS control unit 20a in the second exemplary embodiment, the OFS control unit 20d instructs to update a flow stored in the OFS 30, based on an OF action (i.e. an action of a flow created by the OFS control unit 20a) stored in the flow management table 22. That is, the OFS control unit 20d sets the OF action stored in the flow management table 22, in the OFS 30. For example, when the OFS 30 is connected, the OFS control unit 20d reads an OF action corresponding to switch identification information indicating the connected OFS 30, from the flow management table 22. The OFS control unit 20d then creates a message for updating a flow, and instructs the OFF transmission unit 21 to transmit the message to the OFS 30. Note that the OFS control unit 20d may read all OF actions stored in the flow management table 22, regardless of the switch identification information. Moreover, the OFS control unit 20d may perform the above-mentioned processing in the case where the OFC 10d receives, from the OFS 30, a message requesting an action of a flow.

The OFS control unit 20d is realized by a CPU of a computer operating according to a program (relay control program). The OFS control unit 20d may also be realized by dedicated hardware.

Figure 16:
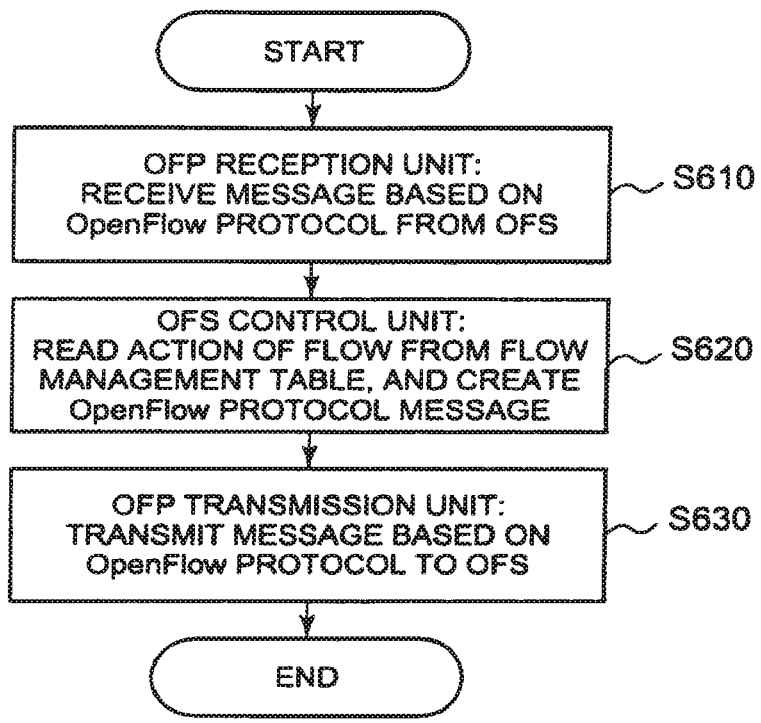
FIG. 16 is a flowchart showing an example of processing in the case of receiving a message requesting an action of a flow.

The following describes an operation. FIG. 16 is a flowchart showing an example of processing in the case where the OFC 10d receives a message requesting an action of a flow, from the OFS 30. When the OFP reception unit 11 receives the message requesting the action of the flow from the OFS 30 (step S610), the OFS control unit 20d reads the action (OF action) of the flow from the flow management table 22, and creates a message based on the OFF (step S620). The OFF transmission unit 21 transmits the message created by the OFS control unit 20d based on the OFP, to the OFS 30 (step S630).

As described above, according to this exemplary embodiment, the OFS control unit 20d sets flow stored in the flow management table 22, in the packet relay unit. Therefore, even in the case where an update of the policy table 12 cannot be detected as in the second exemplary embodiment, the flow indicating the Deny process can be reflected on the OFS 30.

Figure 17:
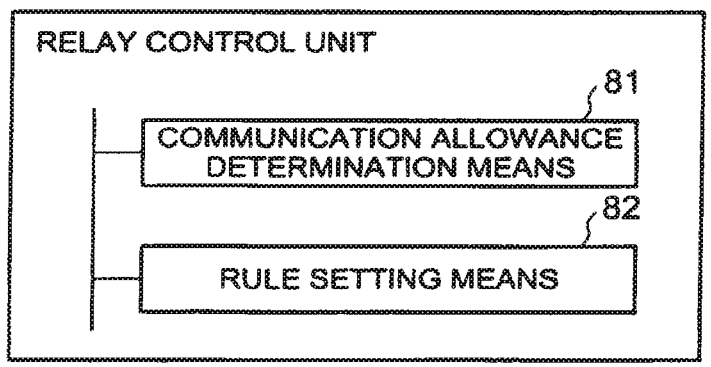
FIG. 17 is a block diagram showing an example of a minimum structure of a relay control unit according to the present invention.

The following describes an example of a minimum structure of a relay control unit according to the present invention. FIG. 17 is a block diagram showing an example of a minimum structure of a relay control unit according to the present invention. The relay control unit according to the present invention is a relay control unit (e.g. the OFC 10) for controlling a packet relay unit (e.g. the OFS 30), the relay control unit comprising: communication, allowance determination means 81 (e.g. the policy determination unit for determining, using information of a packet received by the packet relay unit and based on a policy which is information associating a match condition with communicability information (e.g. action), whether to allow (e.g. Allow) or not to allow (e.g. Deny) communication to a destination unit for the packet that meets the match condition, the match condition being information identifying the packet, and the communicability information indicating whether to allow or not to allow the communication to the destination unit for the packet that meets the match condition; and rule setting means 82 (e.g. the Deny control unit 17 and the OFS control unit 20) for setting, at least in the packet relay unit receiving the packet, a rule (e.g. flow) of executing a process (e.g. Deny process) for suppressing forwarding of the packet to the destination unit, on condition that the communication allowance determination means 81 determines not to allow (e.g. Deny) the communication to the destination unit for the packet that meets the match condition.

According to such a structure, a load of processing performed by the packet relay unit for a packet for which communication to a destination unit is not allowed can be reduced.

Figure 18:
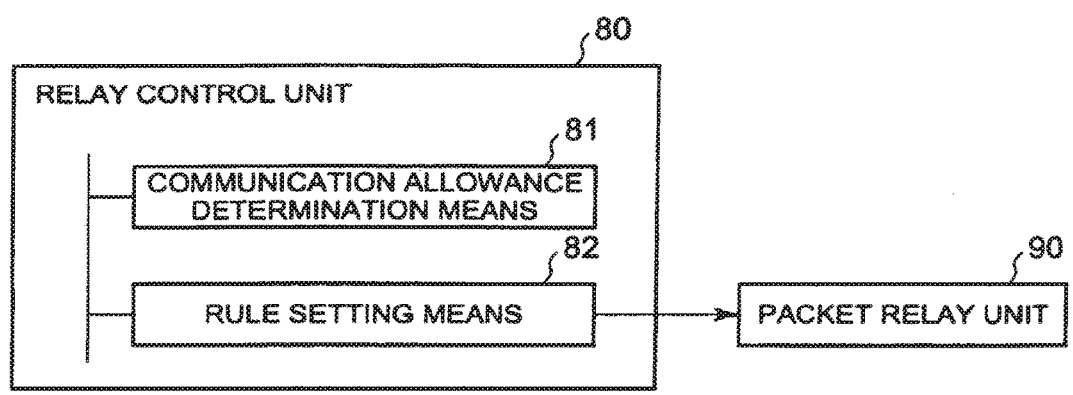
FIG. 18 is a block diagram showing an example of a minimum structure of a relay control system according to the present invention.

Moreover, as shown in a block diagram of FIG. 18, packet relay unit 90 may be provided to a relay control unit 80 according to the present invention to thereby form a relay control system.

Figure 19:
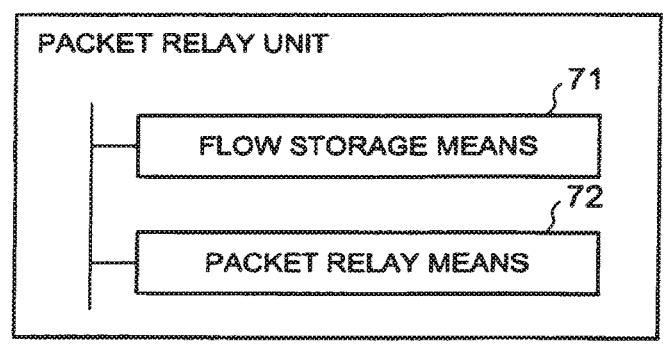
FIG. 19 is a block diagram showing an example of a minimum structure of a packet relay unit according to the present invention.
Figures 20, 21, 22:
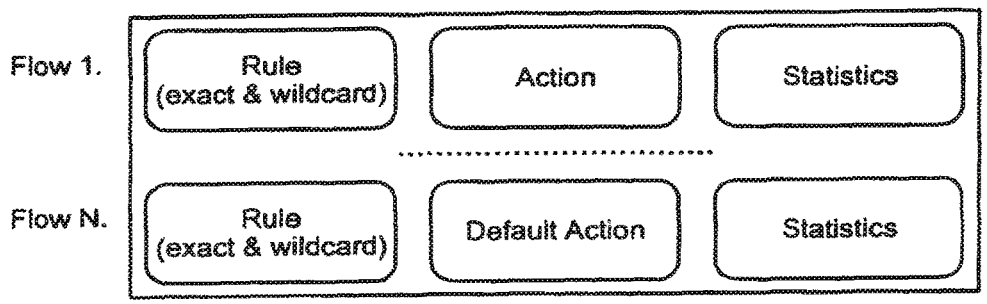
FIG. 20 is an explanatory diagram showing flow entries stored in a flow table.
FIG. 21 is an explanatory diagram showing fields against which a packet header is checked.
FIG. 22 is an explanatory diagram showing actions set for a flow.

The following describes an example of a minimum structure of a packet relay unit according to the present invention. FIG. 19 is a block diagram showing an example of a minimum structure of a packet relay unit according to the present invention. The packet relay unit according to the present invention comprises: flow storage means 71 (e.g. the storage unit 32) for storing a flow which is information associating a process for a received packet with information identifying the packet; and packet relay means 72 (e.g. the control unit 33) for relaying the received packet based on the flow stored in the flow storage means 71.

The packet relay means 72 transmits information of the packet to a relay control unit (e.g. the OFC 10) in the case where the flow associated with the received packet is not stored in the flow storage means 71, and processes the packet based on the flow set by the relay control unit, the relay control unit: determining, using the information of the received packet and based on a policy which is information associating a match condition with communicability information (e.g. action), whether to allow (e.g. Allow) or not to allow (e.g. Deny) communication to a destination unit for the packet that meets the match condition, the match condition being information identifying the packet, and the communicability information indicating whether to allow or not to allow the communication to the destination unit for the packet that meets the match condition; and setting, at least in a source unit receiving the packet, the flow of executing a process (e.g. Deny process) for suppressing forwarding of the packet that meets the match condition to the destination unit, on condition that the communication to the destination unit is determined not to be allowed (e.g. Deny) for the packet.

According to such a structure, a load of processing performed by the packet relay unit for a packet for which communication to a destination unit is not allowed can be reduced.

Note that at least the following relay control unit, relay system, and packet relay unit are also included in any of the exemplary embodiments described above.

(1) A relay control unit (e.g. the OFC 10) for controlling a packet relay unit (e.g. the OFS 30), the relay control unit comprising: communication allowance determination means (e.g. the policy determination unit 15) for determining, using information of a packet received by the packet relay unit and based on a policy which is information associating a match condition with communicability information (e.g. action), whether to allow (e.g. Allow) or not to allow (e.g. Deny) communication to a destination unit for the packet that meets the match condition, the match condition being information identifying the packet, and the communicability information indicating whether to allow or not to allow the communication to the destination unit for the packet that meets the match condition; and rule setting means (e.g. the Deny control unit 17 and the OFS control unit 20) for setting, at least in the packet relay unit receiving the packet, a rule (e.g. flow) of executing a process (e.g. Deny process) for suppressing forwarding of the packet to the destination unit, on condition that the communication allowance determination means determines not to allow (e.g. Deny) the communication to the destination unit for the packet that meets the match condition.

(2) The relay control unit wherein the rule setting means (e.g. the Deny control unit 17 and the OFS control unit 20) sets, at least in the packet relay unit receiving the packet, a rule for discarding (e.g. Drop) the packet that meets the match condition.

(3) The relay control unit wherein the rule setting means (e.g. the Deny control unit 17 and the OFS control unit 20) sets, at least in the packet relay unit receiving the packet, a rule for transmitting the packet that meets the match condition to another destination (e.g. a quarantine network, a honeypot, a detailed flow behavior analysis unit, and so on) different from the destination unit.

(4) The relay control unit comprising path computation means (e.g. the path computation unit 18) for computing a path to a predetermined destination according to the match condition, wherein the rule setting means sets, at least in the packet relay unit receiving the packet, a rule for transmitting the packet that meets the match condition to the destination computed by the path computation means.

(5) The relay control unit comprising log creation means (e.g. the Deny log creation unit 19) for creating a log (e.g. Deny log) indicating that the communication allowance determination means (e.g. the policy determination unit 15) determines not to allow the communication to the destination unit, wherein the rule setting means sets, in the packet relay unit, a rule for transmitting the information of the packet to the relay control unit, when the packet relay unit receives the packet for which the process (e.g. Deny process) for suppressing the forwarding to the destination unit is executed, and wherein the log creation means creates the log, when receiving the information of the packet from the packet relay unit.

(6) The relay control unit comprising rule storage means (e.g. the flow management table 22) for storing the rule set in the packet relay unit, wherein the rule setting means (e.g. the Deny control unit 17 and the OFS control unit 20*a*): stores the rule into the rule storage means, when setting the rule in the packet relay unit; and, in the case where the rule to be set in the packet relay unit is already stored in the rule storage means when the communication allowance determination means determines not to allow the communication to the destination unit for the packet that meets the match condition, does not set the rule in the packet relay unit.

(7) The relay control unit comprising determination count storage means (e.g. the Deny counter table 23) for storing the number (e.g. counter value) of determinations for the packet for which the communication allowance determination means (e.g. the policy determination unit 15) determines not to allow the communication to the destination unit, in association with an element identifying the packet, wherein the rule setting means (e.g. the Deny control unit 17*b* and the OFS control unit 20); increases the number of determinations for the packet associated with the element, when the communication allowance determination means determines not to allow the communication to the destination unit; and sets, in the packet relay unit, a rule for suppressing transmission of the information of the packet to the relay control unit, in the case where the number of determinations for the packet exceeds a predetermined threshold (e.g. Deny process count threshold).

(8) The relay control unit comprising: path candidate computation means (e.g. the path computation unit 18) for computing one or more path candidates to the destination unit of the packet, on condition that the communication allowance determination means (e.g. the policy determination unit 15) determines to allow (e.g. Allow) the communication to the destination unit for the packet that meets the match condition; and path determination means (e.g. the Allow control unit 16c) for determining, for each of the path candidates, whether or not a packet relay unit determining not to allow the communication of the packet exists on the path candidate, wherein, in the case where the packet relay unit determining not to allow the communication of the packet exists on each path of all of the path candidates, the rule setting means (e.g. the Deny control unit 17 and the OFS control unit 20) sets, at least in the packet relay unit receiving the packet, the rule of executing the process (e.g. Deny process) for suppressing the forwarding of the packet to the destination unit.

(9) The relay control unit wherein, in the case where the packet relay unit (e.g. switch) that does not allow the communication of the packet that meets the match condition exists on the path, the rule setting means (e.g. the Deny control unit 17 and the OFS control unit 20) sets, in the packet relay unit, the rule of executing the process (i.e. Deny process) for suppressing the forwarding of the packet to the destination unit.

(10) The relay control unit wherein the rule setting means (e.g. the OFS control unit 20d) sets the rule (e.g. flow action) stored in the rule storage means (e.g. the flow management table 22), in the packet relay unit.

(11) A relay control system comprising: a packet relay unit (e.g. the OFS 30); and a relay control unit (the OFC 10) for controlling the packet relay unit, wherein the relay control unit includes: communication allowance determination means (e.g. the policy determination unit 15) for determining, using information of a packet received by the packet relay unit and based on a policy which is information associating a match condition with communicability information (e.g. action), whether to allow (e.g. Allow) or not to allow (e.g. Deny) communication to a destination unit for the packet that meets the match condition, the match condition being information identifying the packet, and the communicability information indicating whether to allow or not to allow the communication to the destination unit for the packet that meets the match condition; and rule setting means (e.g. the Deny control unit 17 and the OFS control unit 20) for setting, at least in the packet relay unit receiving the packet, a rule (e.g. flow) of executing a process (e.g. Deny process) for suppressing forwarding of the packet to the destination unit, on condition that the communication allowance determination means determines not to allow (e.g. Deny) the communication to the destination unit for the packet that meets the match condition.

(12) The relay control system wherein the rule setting means sets, at least in the packet relay unit receiving the packet, a rule for discarding the packet that meets the match condition.

(13) The relay control system wherein the rule setting means sets, at least in the packet relay unit receiving the packet, a rule for transmitting the packet that meets the match condition to another destination different from the destination unit.

(14) A packet relay unit comprising: flow storage means (e.g. the storage unit 32) for storing a flow which is information associating a process for a received packet with information identifying the packet; and packet relay means (e.g. the control unit 33) for relaying the received packet based on the flow stored in the flow storage means, wherein the packet relay means transmits information of the packet to a relay control unit (e.g. the OFC 10) in the case where the associated with the received packet is not stored in the flow storage means, and processes the packet based on the flow set by the relay control unit, the relay control unit: determining, using the information of the received packet and based on a policy which is information associating a match condition with communicability information (e.g. action), whether to allow (e.g. Allow) or not to allow (e.g. Deny) communication to a destination unit for the packet that meets the match condition, the match condition being information identifying the packet, and the communicability information indicating whether to allow or not to allow the communication to the destination unit for the packet that meets the match condition; and setting, at least in a source unit receiving the packet, the flow of executing a process (e.g. Deny process) for suppressing forwarding of the packet that meets the match condition to the destination unit, on condition that the communication to the destination unit is determined not to be allowed (e.g. Deny) for the packet.

While the present invention has been described with reference to the above exemplary embodiments and examples, the present invention is not limited to the above exemplary embodiments and examples. Various changes understandable by those skilled in the art within the scope of the present invention can be made to the structures and details of the present invention.

This application claims priority based on Japanese Patent Application No. 2009-209722 filed on Sep. 10, 2009, the disclosure of which is incorporated herein in its entirety.

INDUSTRIAL APPLICABILITY

The present invention is preferably applied to a relay control unit for controlling processing performed by a packet relay unit.

REFERENCE SIGNS LIST

10, 10a, 10b, 10c, 10d OFC
11 OFP reception unit
12 policy table
13 static policy acquisition unit
14 dynamic policy acquisition unit
15 policy determination unit
16, 16c Allow control unit
17, 17b Deny control unit
18 path computation unit
19 Deny log creation unit
20, 20a, 20d OFS control unit
21 OFP transmission unit
22 flow management table
23 Deny counter table
30 OFS
31 network interface unit
32 storage unit
33 control unit
SW1 to SW4 switch
CT1 controller

The invention claimed is:
1. A control apparatus, comprising:
a memory storing a policy rule and a plurality of flow entries each including a processing rule, used by a switch apparatus, to process a packet; and a processor configured to execute program instructions to:
receive a packet-in message from a first switch apparatus;
compare the packet-in message with the policy rule to determine whether a communication of the received packet is allowed;
send, to the first switch apparatus, a first flow entry when it is determined that communication of the received packet is allowed, the first flow entry including a first processing rule for the first switch apparatus to forward a received packet corresponding to the packet-in message; and
send, to the first switch apparatus, a second flow entry when it is determined that communication of the received packet is not allowed, the second flow entry including a second processing rule for the first switch apparatus not to forward the received packet corresponding to the packet-in message.

2. The control apparatus according to claim 1, wherein, to determine whether communication of the received packet is allowed, the processor is further configured to execute program instructions to:
determine whether the packet-in message matches the policy rule;
send, to the first switch apparatus, the first flow entry when it is determined that the packet-in message does not match the policy rule; and
send the second flow entry to the first switch apparatus when it is determined that the packet-in message matches the policy rule.

3. The control apparatus according to claim 1, wherein the second flow entry indicates that the first switch apparatus discards the received packet corresponding to the packet-in message.

4. The control apparatus according to claim 1, wherein the processor is further configured to execute program instructions to detect an update of the policy rule.

5. The control apparatus according to claim 1, wherein the processor is further configured to execute program instructions to count a number of times it is determined that the communication of the received packet is not allowed by the policy rule.

6. The control apparatus according to claim 5, wherein the processor is further configured to execute program instructions to send the second flow entry to the first switch apparatus when the counted number of times exceeds a threshold.

7. A network system, comprising:
a first switch apparatus configured to forward a packet; and
a control apparatus configured to control the first switch apparatus, wherein the control apparatus comprises:
a memory storing a policy rule and a plurality of flow entries each including a processing rule, used by a switch apparatus, to process a packet; and
a processor configured to execute program instructions to:
receive a packet-in message from the first switch apparatus;
compare the packet-in message with the policy rule to determine whether a communication of the received packet is allowed;
send, to the first switch apparatus, a first flow entry when it is determined that communication of the received packet is allowed, the first flow entry including a first processing rule for the first switch apparatus to forward a received packet corresponding to the packet-in message; and
send, to the first switch apparatus, a second flow entry when it is determined that communication of the received packet is not allowed, the second flow entry including a second processing rule for the first switch apparatus not to forward the received packet corresponding to the packet-in message.

8. The network system according to claim 7, wherein, to determine whether communication of the received packet is allowed, the processor is further configured to execute program instructions to:
determine whether the packet-in message matches the policy rule;
send, to the first switch apparatus, the first flow entry when it is determined that the packet-in message does not match the policy rule; and
send the second flow entry to the first switch apparatus when it is determined that the packet-in message matches the policy rule.

9. The network system according to claim 7, wherein the second flow entry indicates that the first switch apparatus discards the received packet corresponding to the packet-in message.

10. The network system according to claim 7, wherein the processor is further configured to execute program instructions to detect an update of the policy rule.

11. The network system according to claim 7, wherein the processor is further configured to execute program instructions to count a number of times it is determined that the communication of the received packet is not allowed by the policy rule.

12. The network system according to claim 11, wherein the processor is further configured to execute program instructions to send the second flow entry to the first switch apparatus when the counted number of times exceeds a threshold.

13. A network control method, comprising:
receiving a packet-in message from a switch apparatus;
comparing the packet-in message with a policy rule to determine whether a communication of the received packet is allowed;
sending, to the switch apparatus, a first flow entry when it is determined that communication of the received packet is allowed, the first flow entry including a first processing rule for the switch apparatus to forward a received packet corresponding to the packet-in message; and
sending, to the switch apparatus, a second flow entry when it is determined that communication of the received packet is not allowed, the second flow entry including a second processing rule for the switch apparatus not to forward the received packet corresponding to the packet-in message.

14. The network control method according to claim 13, further comprising:
determining whether the packet-in message matches the policy rule;
sending, to the switch apparatus, the first flow entry when it is determined that the packet-in message does not match the policy rule; and
sending the second flow entry to the switch apparatus when it is determined that the packet-in message matches the policy rule.

15. The network control method according to claim 13, wherein the second flow entry indicates that the switch apparatus discards the received packet corresponding to the packet-in message.

16. The network control method according to claim 13, further comprising of detecting an update of the policy rule.

17. The network control method according to claim 13, further comprising of counting a number of times it is determined that the communication of the received packet is not allowed by the policy rule.

18. The network control method according to claim 17, further comprising of sending the second flow entry to the switch apparatus when the counted number of times exceeds a threshold.

* * * * *